US010853849B2

(12) United States Patent
Yu et al.

(10) Patent No.: US 10,853,849 B2
(45) Date of Patent: Dec. 1, 2020

(54) METHOD AND SYSTEM FOR SERVICE ENABLEMENT

(71) Applicant: Alibaba Group Holding Limited, George Town (KY)

(72) Inventors: Liying Yu, Hangzhou (CN); Hang Chen, Hangzhou (CN); Guanqian Dong, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 542 days.

(21) Appl. No.: 15/403,843

(22) Filed: Jan. 11, 2017

(65) Prior Publication Data
US 2017/0200202 A1    Jul. 13, 2017

(30) Foreign Application Priority Data

Jan. 13, 2016 (CN) .......................... 2016 1 0022611

(51) Int. Cl.
*G06Q 30/02* (2012.01)
*G06Q 50/00* (2012.01)
(52) U.S. Cl.
CPC ..... *G06Q 30/0277* (2013.01); *G06Q 30/0215* (2013.01); *G06Q 50/01* (2013.01)
(58) Field of Classification Search
CPC . G06Q 30/0277; G06Q 30/0215; G06Q 50/01
USPC .................. 705/14.1, 7.13; 382/115; 726/7
See application file for complete search history.

(56) References Cited

U.S. PATENT DOCUMENTS

| 6,424,711 B1 | 7/2002 | Bayless |
| 7,035,923 B1 | 4/2006 | Yoakum |
| 7,133,687 B1 | 11/2006 | El-Fishawy |
| 7,159,191 B2 | 1/2007 | Koivuniemi |

(Continued)

FOREIGN PATENT DOCUMENTS

| CN | 101094233 | 12/2007 |
| CN | 103632332 | 3/2014 |

(Continued)

OTHER PUBLICATIONS

Christoph F. Breidbach, Ananth Srinivasan, 2012, Connectivity in Service Systems: Does Technology-Enablement Impact the Ability of a Service System to Co-Create Value (Year: 2012).*

(Continued)

*Primary Examiner* — Tarek Elchanti
(74) *Attorney, Agent, or Firm* — Shun Yao; Park, Vaughan, Flemng & Dowler LLP

(57) ABSTRACT

One embodiment described herein can provide a system for enabling a service over a computer network. During operation, the system receives, from a first client device, an object-distribution request. In response to the request, the system generates an object package containing a number of objects based on the request and obtains at least one challenge associated with the object package and a predetermined response corresponding to the challenge. The system then presents the challenge to a user of a second client device and receives a response to the challenge from the second client device. In response to the received response to the challenge meeting one or more of predetermined criteria, the system causes the object package to be distributed to the second client device over the computer network.

15 Claims, 16 Drawing Sheets

(56) References Cited

U.S. PATENT DOCUMENTS

| | | |
|---|---|---|
| 7,197,122 B2 | 3/2007 | Vuori |
| 7,398,252 B2 | 7/2008 | Neofytides |
| 7,603,413 B1 | 10/2009 | Herold |
| 7,653,691 B2 | 1/2010 | Lasensky |
| 7,669,134 B1 | 2/2010 | Christie |
| 7,835,955 B1 | 11/2010 | Brodsky |
| 8,165,609 B2 | 4/2012 | Fang |
| 8,316,096 B2 | 11/2012 | Svendsen |
| 8,352,341 B1 | 1/2013 | Greenberg |
| 8,355,699 B1 | 1/2013 | Lo |
| 8,548,865 B1 | 10/2013 | Ho |
| 8,670,791 B2 | 3/2014 | Ye |
| 8,768,310 B1 | 7/2014 | Oroskar |
| 8,769,022 B2 | 7/2014 | Tivyan |
| 8,788,602 B1 | 7/2014 | Wan |
| 8,843,117 B2 | 9/2014 | Sigmund |
| 8,856,244 B2 | 10/2014 | Madnani |
| 8,880,725 B2 | 11/2014 | Ananthanarayanan |
| 8,929,871 B2 | 1/2015 | Bradburn |
| 8,968,103 B2 | 3/2015 | Zhou |
| 9,021,040 B1 | 4/2015 | Andrews |
| 9,117,197 B1 | 8/2015 | Sharma |
| 9,143,477 B2 | 9/2015 | Murthy |
| 9,185,062 B1 | 11/2015 | Yang |
| 9,230,244 B2 | 1/2016 | Patil |
| 9,253,639 B1 | 2/2016 | Lafuente |
| 9,578,160 B2 | 2/2017 | Kim |
| 9,800,525 B1 | 10/2017 | Lerner |
| 10,021,203 B2 | 7/2018 | Papakipos |
| 10,200,332 B2 | 2/2019 | Wu |
| 10,417,037 B2 | 9/2019 | Gruber |
| 2002/0016163 A1 | 2/2002 | Burgan |
| 2002/0120453 A1 | 8/2002 | Lee |
| 2003/0084109 A1 | 5/2003 | Balluff |
| 2003/0135559 A1 | 7/2003 | Bellotti |
| 2003/0154249 A1 | 8/2003 | Crockett |
| 2004/0002932 A1 | 1/2004 | Horvitz |
| 2004/0006599 A1 | 1/2004 | Bates |
| 2004/0085360 A1 | 5/2004 | Pratt |
| 2004/0102962 A1 | 5/2004 | Wei |
| 2005/0149855 A1 | 7/2005 | Loo |
| 2005/0177368 A1 | 8/2005 | Odinak |
| 2006/0093142 A1 | 5/2006 | Schneier |
| 2006/0229890 A1 | 10/2006 | Sattler |
| 2007/0060193 A1 | 3/2007 | Kim |
| 2007/0105572 A1 | 5/2007 | Kim |
| 2007/0123223 A1 | 5/2007 | Letourneau |
| 2007/0233801 A1 | 10/2007 | Eren |
| 2007/0299565 A1 | 12/2007 | Oesterling |
| 2008/0112596 A1* | 5/2008 | Rhoads ............. G06K 9/00577 382/115 |
| 2008/0114776 A1 | 5/2008 | Sun |
| 2008/0168361 A1 | 7/2008 | Forstall |
| 2008/0168379 A1 | 7/2008 | Forstall |
| 2008/0307040 A1 | 12/2008 | So |
| 2008/0307094 A1 | 12/2008 | Karonen |
| 2009/0018903 A1 | 1/2009 | Iyer |
| 2009/0240497 A1 | 9/2009 | Usher |
| 2009/0287776 A1 | 11/2009 | Corry |
| 2010/0004971 A1 | 1/2010 | Lee |
| 2010/0005402 A1 | 1/2010 | George |
| 2010/0017481 A1 | 1/2010 | Chen |
| 2010/0023341 A1 | 1/2010 | Ledbetter |
| 2010/0056109 A1 | 3/2010 | Wilson et al. |
| 2010/0105362 A1 | 4/2010 | Yang |
| 2010/0205541 A1 | 8/2010 | Rapaport |
| 2010/0216448 A1 | 8/2010 | Jeon |
| 2010/0323752 A1 | 12/2010 | Park |
| 2011/0019662 A1 | 1/2011 | Katis |
| 2011/0035687 A1 | 2/2011 | Katis |
| 2011/0136431 A1 | 6/2011 | Haaramo |
| 2011/0145823 A1 | 6/2011 | Rowe |
| 2011/0173041 A1* | 7/2011 | Breitenbach ..... G06Q 10/06311 705/7.13 |
| 2011/0173548 A1 | 7/2011 | Madnani |
| 2011/0243113 A1 | 10/2011 | Hjelm |
| 2011/0313803 A1 | 12/2011 | Friend |
| 2011/0314402 A1 | 12/2011 | Kikin-Gil |
| 2012/0030301 A1 | 2/2012 | Herold |
| 2012/0046077 A1 | 2/2012 | Kim |
| 2012/0059842 A1 | 3/2012 | Hille-Doering |
| 2012/0108268 A1 | 5/2012 | Lau |
| 2012/0185547 A1 | 7/2012 | Hugg |
| 2012/0290950 A1 | 11/2012 | Rapaport |
| 2012/0311585 A1 | 12/2012 | Gruber |
| 2013/0069969 A1 | 3/2013 | Chang |
| 2013/0080580 A1 | 3/2013 | Nagai |
| 2013/0086071 A1 | 4/2013 | Riedel |
| 2013/0133055 A1* | 5/2013 | Ali ..................... H04L 63/0861 726/7 |
| 2013/0138726 A1 | 5/2013 | Shin |
| 2013/0144702 A1 | 6/2013 | Tabor |
| 2013/0173723 A1 | 7/2013 | Herold |
| 2013/0227029 A1 | 8/2013 | Hymel |
| 2013/0227041 A1 | 8/2013 | Rideout |
| 2013/0268418 A1 | 10/2013 | Sardi |
| 2013/0268765 A1 | 10/2013 | Kent, Jr. |
| 2013/0275164 A1 | 10/2013 | Gruber |
| 2013/0297493 A1 | 11/2013 | Linden |
| 2013/0298006 A1 | 11/2013 | Good |
| 2013/0311920 A1 | 11/2013 | Koo Bon Joon |
| 2013/0332162 A1 | 12/2013 | Keen |
| 2013/0332307 A1 | 12/2013 | Linden |
| 2014/0025546 A1 | 1/2014 | Seng |
| 2014/0035956 A1 | 2/2014 | Hay Catharine |
| 2014/0070945 A1 | 3/2014 | Dave |
| 2014/0074483 A1 | 3/2014 | Van Os |
| 2014/0101263 A1 | 4/2014 | Wu |
| 2014/0164073 A1 | 6/2014 | Mosley |
| 2014/0184544 A1 | 7/2014 | Lim |
| 2014/0191986 A1 | 7/2014 | Kim |
| 2014/0207659 A1 | 7/2014 | Erez |
| 2014/0213318 A1 | 7/2014 | Leem |
| 2014/0279315 A1 | 9/2014 | Courter |
| 2014/0280615 A1 | 9/2014 | Burlin |
| 2014/0297348 A1 | 10/2014 | Ellis |
| 2014/0331150 A1 | 11/2014 | Griffin |
| 2014/0372516 A1 | 12/2014 | Watte |
| 2015/0039708 A1 | 2/2015 | Liu |
| 2015/0081486 A1 | 3/2015 | Niazi |
| 2015/0135046 A1 | 5/2015 | Moore |
| 2015/0170104 A1 | 6/2015 | Yamada |
| 2015/0207926 A1 | 7/2015 | Brown |
| 2015/0256353 A1 | 9/2015 | Busey |
| 2015/0264303 A1 | 9/2015 | Chastney |
| 2015/0296450 A1 | 10/2015 | Koo |
| 2015/0310567 A1 | 10/2015 | Wu |
| 2015/0317590 A1 | 11/2015 | Karlson |
| 2015/0346821 A1 | 12/2015 | Ichimura |
| 2015/0350130 A1 | 12/2015 | Yang |
| 2015/0350225 A1 | 12/2015 | Perold |
| 2016/0055215 A1 | 2/2016 | Kauwe |
| 2016/0062574 A1 | 3/2016 | Anzures |
| 2016/0094509 A1 | 3/2016 | Ye |
| 2016/0125363 A1 | 5/2016 | Hung |
| 2016/0132971 A1 | 5/2016 | Teh |
| 2016/0202889 A1 | 7/2016 | Shin |
| 2016/0205049 A1 | 7/2016 | Kim |
| 2016/0227019 A1 | 8/2016 | Seol |
| 2016/0242007 A1 | 8/2016 | Mihara |
| 2016/0330163 A1 | 11/2016 | Le Gall |
| 2017/0041255 A1 | 2/2017 | Dong |
| 2017/0118147 A1 | 4/2017 | Dold |
| 2017/0142212 A1 | 5/2017 | Bifulco |
| 2017/0171135 A1 | 6/2017 | Wu |
| 2017/0185930 A1 | 6/2017 | Perry |
| 2017/0185965 A1 | 6/2017 | Nishizawa |
| 2017/0228699 A1 | 8/2017 | Pang |
| 2018/0088784 A1 | 3/2018 | Zhu |

(56) References Cited

U.S. PATENT DOCUMENTS

2019/0012527 A1     1/2019   Wang
2019/0014070 A1     1/2019   Mertvetsov

FOREIGN PATENT DOCUMENTS

| | | | |
|---|---|---|---|
| CN | 105282328 | 1/2016 | |
| CN | 105306600 | 2/2016 | |
| JP | 2011059811 | 3/2011 | |
| JP | 2011517380 | 6/2011 | |
| JP | 2014106592 | 6/2014 | |
| JP | 2014115716 | 6/2014 | |
| WO | 1999037052 | 7/1999 | |
| WO | WO-2006018826 A1 * | 2/2006 | ............ G06F 21/33 |
| WO | 2007007330 | 1/2007 | |
| WO | 2011117456 | 9/2011 | |
| WO | 2014008782 | 1/2014 | |
| WO | 2015017029 | 2/2015 | |
| WO | 2015113458 | 8/2015 | |
| WO | 2016016248 | 2/2016 | |
| WO | 2016050146 | 4/2016 | |
| WO | 2016054629 | 4/2016 | |

OTHER PUBLICATIONS

Gwynee, Guilford, "WeChat's little red envelopes are brilliant marketing for mobile payments," published on the internet at https://qz.com, on Jan. 29, 2014 (Year: 2014).

Anonymous, "Crowdsource Your Company's Bonuses," I Done This Blog, www.blog.idonethis.com, May 30, 2012 (Year:2012).

Hao Yunhong, Qian Chen, "Decentralization and Compensation Reforms in China: The Case of Xiaoshan InterTrade," 2008 ISECS International Colloquium on Computing, Communication, Control and Management, IEEE Computer Society (Year: 2008).

Ozimec et al., "Moticational Inventives for developing salesforce performance in emerging markets," University of Zagreb, Croatia, IEEE (Year: 2011).

"Managing Activities with TVACTA: TaskVista and Activity-Centered Task Assistant", V Bellotti, JD Thornton-Proc. sigir Workshop on PIM, 2006 academia.edu (Year:2006).

* cited by examiner

METHOD AND SYSTEM FOR SERVICE ENABLEMENT

RELATED APPLICATION

Under 35 U.S.C. § 119, this application claims the benefit and right of priority of Chinese Patent Application No. 201610022611.5, filed on Jan. 13, 2016.

BACKGROUND

Field

This disclosure is generally related to service enablement. More specifically, this disclosure is related to techniques, devices, and systems for enabling a service, which involves distribution of cash rewards or virtual merchandise.

Related Art

The rapid development of mobile technologies has fundamentally changed the ways people communicate with each other. In addition to conventional phone calls and text messages, more and more people are relying on social networking apps (e.g., Facebook® and Instagram®) to stay connected. In addition to text, many social networking apps allow users to send voice messages, pictures, and videos.

In addition, many marketers have turned to the same social networking apps when they try to reach a large audience. In addition to displaying advertisements using social networking apps, marketers can also target special groups of users using the social networking apps. For example, WeChat and Enterprise WeChat (mobile text and voice messaging communication services developed by Tencent Inc. of China) both provide a "red envelope" (also known as "hong bao") function that allows marketers to distribute cash or coupons to users in order to promote their brand. Taobao and Tmall (Taobao and Tmall are the online shopping websites operated by Alibaba Group of China) also provide similar mobile apps that can be used as a promotion platform for marketers. The red-envelope function can also be used by enterprise users (e.g., employers or managers) for distribution of bonuses to employees or by regular users for gifting friends.

A typical way of distributing such virtual red envelopes among a user group (e.g., participants of a group chat) or over a mobile app is to display a red-envelope icon within the user interface, and a user can "open" a red envelope by selecting the red-envelope icon (e.g., by tapping a corresponding location on the touchscreen display). If there are still unclaimed red envelopes represented by the same red-envelope icon, the contents (e.g., real or virtual money) of a red envelope will be deposited into the user's account. Otherwise, a message can be displayed, indicating to the user that all red envelopes have been claimed. In conventional approaches, users with faster network connections are able to open the red envelopes first, especially when the red envelopes are distributed at a particular time (e.g., at midnight on New Year's Eve). This can be unfair to users with poor network connections. Moreover, the low level of user interactions with the traditional red envelope functions is making them less appealing to marketers.

SUMMARY

One embodiment described herein can provide a system for enabling a service over a computer network. During operation, the system receives, from a first client device, an object-distribution request. In response to the request, the system generates an object package containing a number of objects based on the request and obtains at least one challenge associated with the object package and a predetermined response corresponding to the challenge. The system then presents the challenge to a user of a second client device and receives a response to the challenge from the second client device. In response to the received response to the challenge meeting one or more of predetermined criteria, the system can cause the object package to be distributed to the second client device over the computer network.

In a variation on this embodiment, obtaining the challenge and the predetermined response involves one of: extracting the challenge from a pre-installed challenge bank, receiving an input from a user of the first client device to select the challenge and the predetermined response from the pre-installed challenge bank, and receiving an input that includes the challenge and the predetermined response from the user of the first client device.

In a variation on this embodiment, the challenge includes an open ended question or a multiple-choice question.

In a variation on this embodiment, the predetermined criteria include one or more of: the received response at least partially matching the predetermined response corresponding to the challenge, a string length the received response exceeding a predetermined value, and the received response includes one or more predetermined keywords.

In a variation on this embodiment, in response to receiving, from the user of the second client device, a response to a first challenge, the system determines whether the response to the first challenge meets at least one of the predetermined criteria. The system presents to the user of the second client device a second challenge in response to determining that the response to the first challenge meets at least one of the predetermined criteria.

In a further variation, in response to determining that the response to the first challenge meets at least one of the predetermined criteria, the system sends a corresponding portion of the object package to the second client device.

In a variation on this embodiment, the system presents the challenge to multiple users corresponding to multiple client devices and receives responses to the challenge from the multiple client devices. Based on a time sequence of the received response, the system consecutively determines whether the received responses meet at least one of the predetermined criteria. In response to determining that a first response meets at least one of the predetermined criteria and there is at least one to-be-distributed object package, the system sends the object package to a client device submitting the first response over the computer network, and decreases a count of to-be-distributed object packages by 1.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and system for distributing cash rewards or virtual merchandise using mobile apps. More specifically, embodiments of the present invention provide a novel "red envelope" function that facilitates dynamic interactions between senders and recipients of virtual red envelopes. During operation, when a user attempts to open a "red envelope," the system can dynamically generate and present to the user one or more challenges, which can include multiple-choice or open-ended questions. The system can also determine whether to deliver the "red envelope" to a user's account and the content of the "red envelope" based on the user's responses to those challenges. In some embodiments, the system can generate challenges in different categories, and the user can choose a particular category of challenge. In addition to system-generated challenges, in some embodiments, the system can also allow individual senders of red envelopes to create or edit the challenges.

Service-Distribution System

Different variations of the "red envelope" functions in mobile apps have been used by many businesses for enablement of certain services, such as delivering promotional material. In addition to traditional red-envelope functions that allow the recipient to open a red-envelope with a simple tap or click, password-protected red envelopes have also been used by marketers. To open those red envelopes, the recipient needs to input a password or code, which has been previously published by the marketer.

Figure 1B:
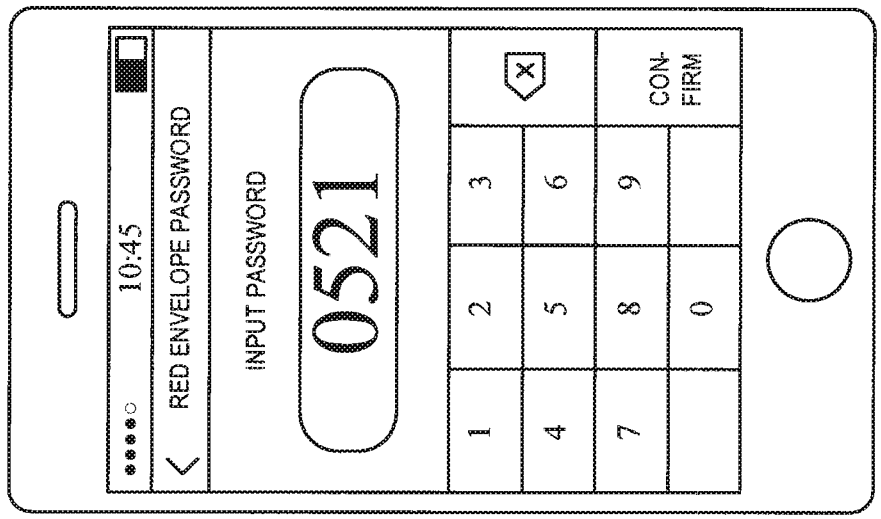
FIGS. 1A and 1B present exemplary user interfaces for red-envelope distribution.
Figure 1A:
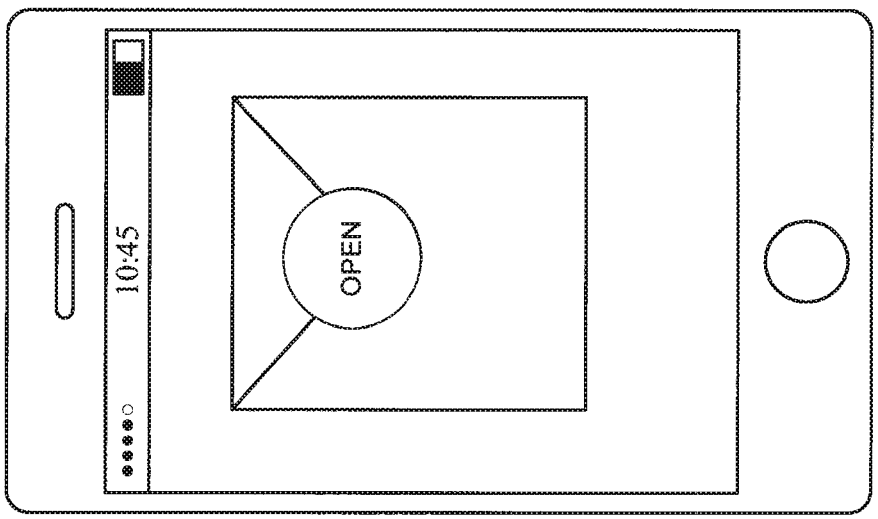

FIGS. 1A and 1B present exemplary user interfaces for red-envelope distribution. In FIG. 1A, a red-envelope icon is shown on the user interface, prompting the user to open the red envelope by clicking the red-envelope icon. If the red envelope is the click-to-open type, the user can directly obtain the contents inside the red envelope. If the red envelope is password-protected, a second user interface like the one shown in FIG. 1B will be displayed, prompting the user to enter a password for the red envelope. Requiring the user to enter a password increases the level of interaction between the user and the marketer, because the user needs to monitor the password information, which can be time-sensitive, sent out by the marketer in order to obtain the promotional material. Moreover, when a user is sending red envelopes to friends, using a password can also increase the security level. However, even with password-protected red envelopes, the interactions between the sender and recipients are static and limited. Additional interactions may be desired. In some embodiments, the red-envelope distribution process can include a game element, such as challenges and responses. The gamification of the red-envelope function can provide dynamic interactions between the senders and recipients, making them an effective tool for marketers to engage customers.

Figure 2:
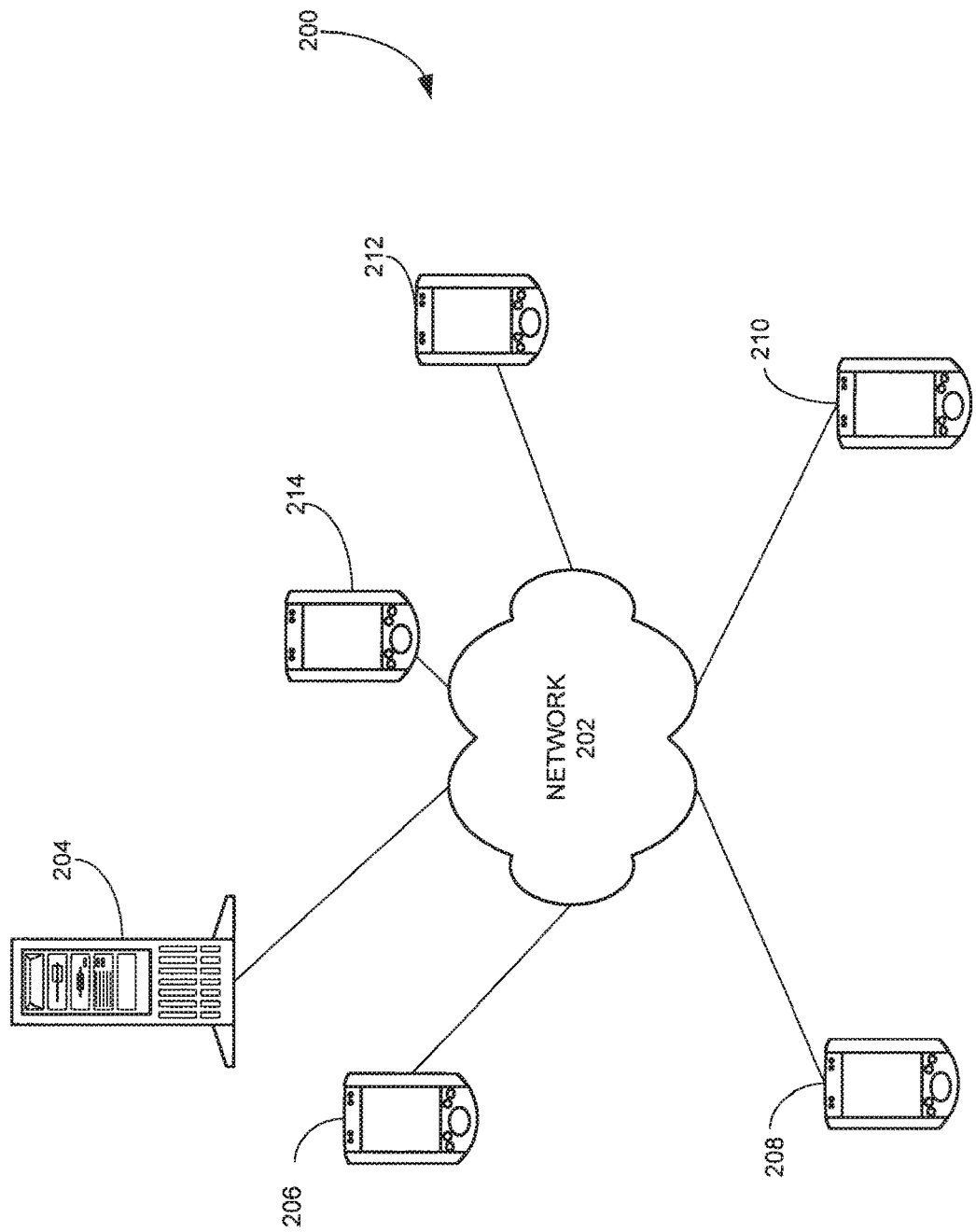
FIG. 2 presents a diagram illustrating an exemplary service-enablement system, in accordance with an embodiment of the present invention.

FIG. 2 presents a diagram illustrating an exemplary service-enablement system, in accordance with an embodiment of the present invention. In FIG. 2, service-enablement system 200 includes a network 202, a server 204, and a number of mobile devices, including mobile devices 206, 208, 210, 212, and 214.

Server 204 can be a physical server that includes a standalone computer, a virtual server provided by a cluster of standalone computers, or a cloud server. During operation, server 204 can run the server-side programs of the service-enablement application, such as a red-envelope application.

Network 202 can include various types of wired or wireless networks. In some embodiments, network 202 can include the public switched telephone network (PSTN) and the Internet. Mobile devices 206-214 can include various computing devices, including but not limited to: smartphones, tablet computers, laptop computers, personal digital assistants (PDAs), various wearable computing devices (e.g., smartglasses and smartwatches), etc. During operation, mobile devices 206-214 can run the client-side programs of the service-enablement application. More specifically, mobile devices 206-214 can communicate with each other via server 204. In certain scenarios, a set of mobile devices can participate in a group-communication session (e.g., a group chat session), which allows a user to distribute red envelopes to other users. In a different scenario, a set of mobile devices can subscribe to a public service (e.g., a payment service) and can receive red envelopes distributed by the public service.

In some embodiments, when distributing the red envelopes, the system can present a set of challenges to recipients, and based on responses received from the recipients, the system can distribute the red envelopes. In further embodiments, the system can combine the challenge-based red-envelope distribution with the click-to-open red-envelope distribution. For example, the system can distribute a portion of the red envelope content to the user once the user clicks the red-envelope icon, and only distribute remaining content after the user correctly responds to the challenges. This increases the level of user interaction, thus promoting user engagement.

Figure 3:
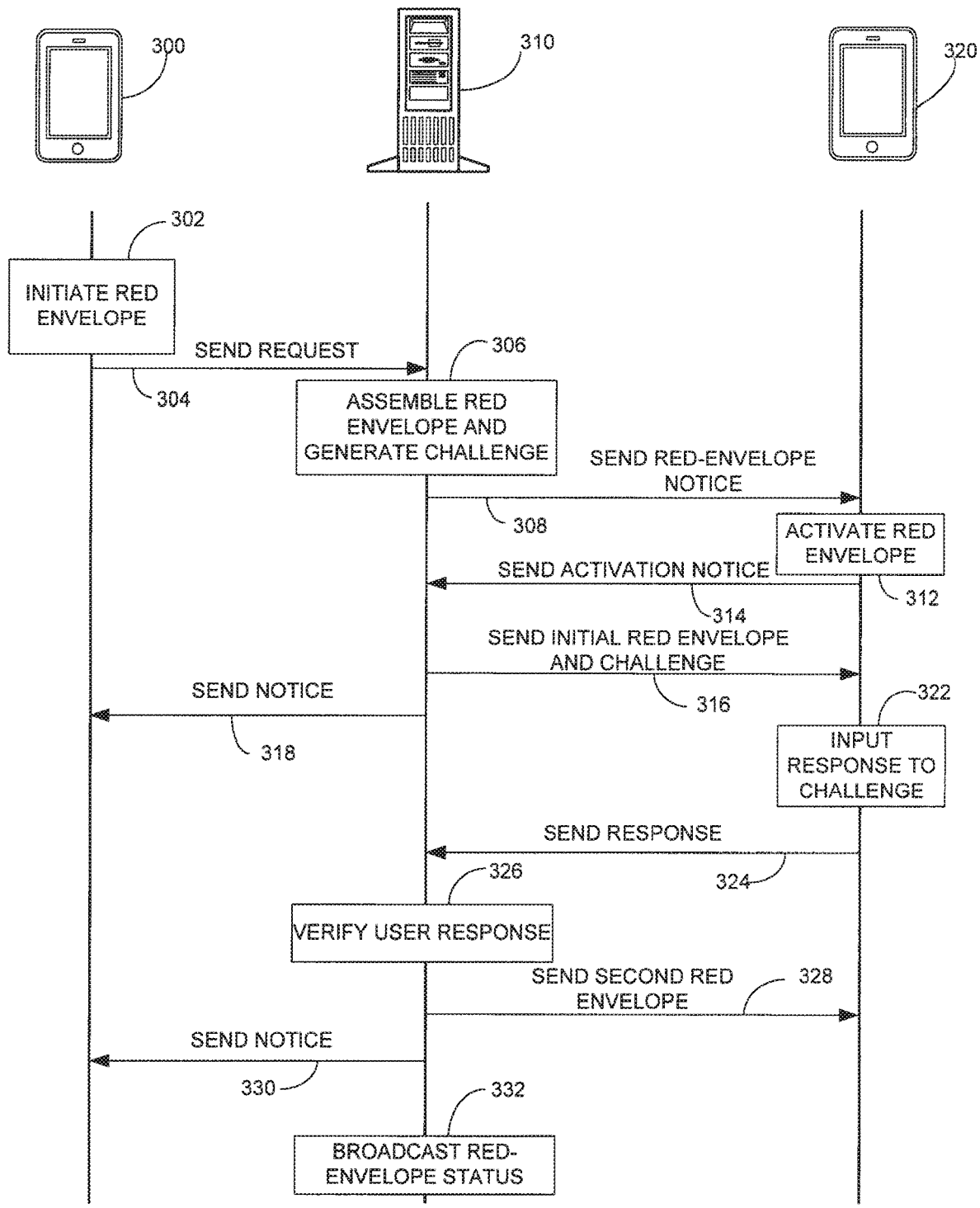
FIG. 3 presents a time-state diagram illustrating an exemplary red-envelope distribution process, in accordance with an embodiment of the present invention.

FIG. 3 presents a time-state diagram illustrating an exemplary red-envelope distribution process, in accordance with an embodiment of the present invention. FIGS. 4A-4G present various screenshots of the user interface associated with the red-envelope distribution process, in accordance with an embodiment of the present invention. The red-envelope distribution process can be described in conjunction with FIG. 3 and FIGS. 4A-4G.

In FIG. 3, a client device 300, which can be a smartphone, initiates one or more red envelopes (operation 302). In some embodiments, initiating the red envelopes can include determining the number and content of the red envelopes. For example, the user of client device 300 can determine the total number of red envelopes to be distributed and, if the red envelopes contain cash, the cash amount included in each envelope. In the lucky-draw scenario, the user may simply define the number of red envelopes and the total money amount to be distributed. To initiate the red envelopes, the user needs to run an app that has the red-envelope function on client device 300, such as an Enterprise Instant Messaging (EIM) system like "DingTalk," which is a product of Alibaba Group of China.

In addition to the number and content, the user can also determine the mode of distribution of the red envelopes. FIG. 4A illustrates the user interface that allows the user to select a distribution mode. In the example shown in FIG. 4A, field 402 allows the user to choose between two distribution modes, the lucky-draw mode and the challenge mode. In the lucky-draw mode, a recipient can open the red envelope with a simple click, and the system randomly assigns the money amount in each red envelope. In the challenge mode, the recipient needs to respond to one or more challenges before he can open a red envelope. Other options are also possible, such as red envelopes containing sender-defined cash values or red envelopes with sender-defined recipients (i.e., the sender of a red envelope can define one or more recipients within the group to click and claim the content in the red envelop). Further details of targeted red envelope delivery can be found in U.S. patent application Ser. No. 15/383,894, filed Dec. 19, 2016, the disclosure of which is incorporated by reference herein.

Figure 4B:
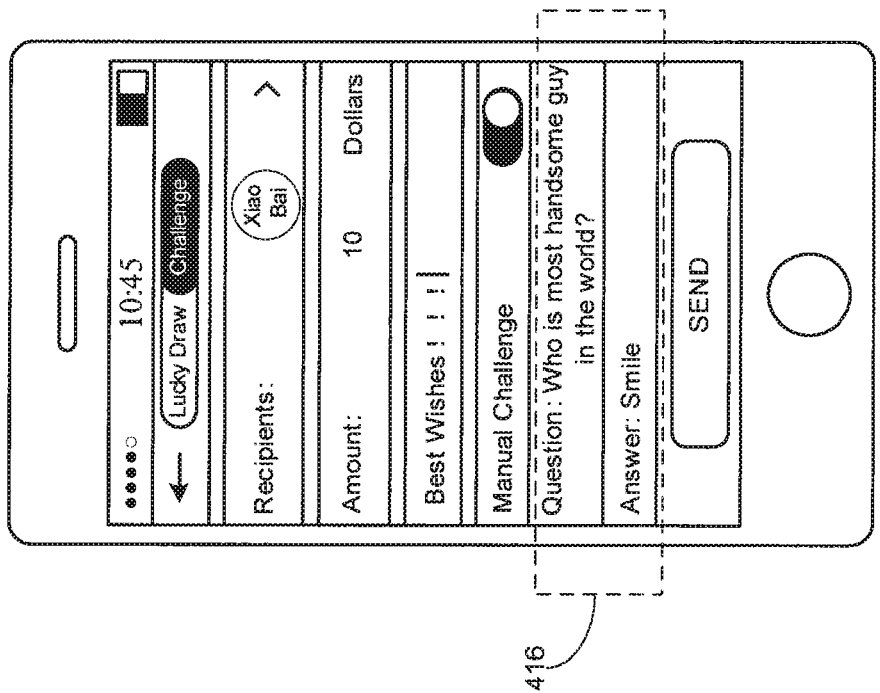
FIGS. 4A-4G present various screenshots of the user interface associated with the red-envelope distribution process, in accordance with an embodiment of the present invention.
Figure 4A:
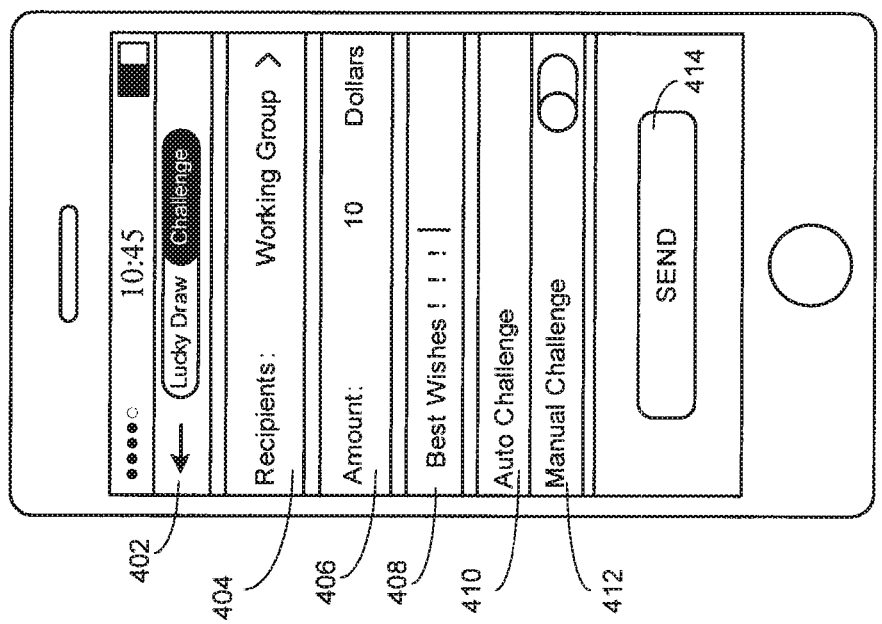

Field 404 shown in FIG. 4A allows the user to set the recipient(s) of the red envelopes, which can be a user group (as shown in FIG. 4A) or an individual (as shown in FIG. 4B). In addition to manually inputting the recipient(s) in field 404, the user can enter the red-envelope interface shown in FIG. 4A or 4B from a group chat or individual chat interface, respectively. For example, to enter the interface shown in FIG. 4A, the user can start from a group chat interface shown in FIG. 4C by initializing a red envelope within the group chat window. In some embodiments, a user may click on the "+" sign, and the system can display a number of additional functions, including the red-envelope function. The generated red envelope can then be displayed in the group chat window shown in FIG. 4C, and members of the group chat can trigger the red-envelope-receiving process by clicking on the red-envelope icon.

Field 406 shown in FIG. 4A allows the user to enter the money amount to be included in the red envelope. In some embodiments, the system may also display a default value (e.g., $10).

Field 408 shown in FIG. 4A allows the user to enter a text message (sometimes referred to as the title of the red envelop) that is delivered along with the red envelope. For example, the user can say "Best Wishes," "Happy Birthday," "Happy New Year," etc. In some embodiments, the system can generate a default title for the red envelope.

Fields 410 and 412 in FIG. 4A allow the user to select the challenge-generation mode. In the example shown in FIG. 4A, the switch in field 412 is at the off (the left side) position, meaning that the auto mode is selected, and the system automatically generates challenges. For example, the system may randomly select trivial questions from a question bank. The questions in the question bank can be updated, either periodically or on a random basis. After the user defines the recipient(s), content, title, and challenge-generation mode of the red envelope, the user can click on button 414 to send the red envelope and challenges.

Returning to FIG. 3, subsequent to the initiation of the red envelopes, client device 300 can send a request to distribute red envelopes to server 310 (operation 304), and server 310 can assemble corresponding red envelopes and generate challenges associated with the red envelopes (operation 306). Note that a "red envelope" mentioned here can also be referred to as a package of to-be-distributed object, and content (e.g., cash or virtual merchandise) in the red envelope can be the to-be-distributed object. Assembling the red envelope can involve selecting from available to-be-distributed objects (e.g., funds that are available to the user of client device 300) a set of objects and packaging them as a package, the package being a red envelope. For example, if the user assigns a cash value for a red envelope, assembling the red envelope can involve obtaining the corresponding money amount from a financial account (e.g., a bank account or a credit card account) associated with the user.

Depending on the user's choice, server 310 can use different methods to generate challenges. As discussed previously, if the user chooses the auto mode (as shown in FIG. 4A), which can be the system default mode, the system can automatically generate challenges. In some embodiments, the system can obtain challenges from a pre-installed challenge bank. The challenges can include open-ended or multiple-choice questions, puzzles, math challenges, etc. In some embodiments, the system can apply one or more predetermined rules to select the challenges. For example, the challenge-selection rule may govern how server 310 selects challenges, either randomly or sequentially. Other more complicated rules can also be applied. For example, the system can select challenges based on a number of external factors, such as timing (e.g., time of the year, month, week, or day) and demographic information of the recipient(s) (e.g., age, sex, education level, etc.).

If the user of client device 300 chooses the manual mode (as shown in FIG. 4B, with the switch for manual challenge moved to the on, or right side position), the system can either allow the user of client device 300 to manually select challenges from a challenge bank or allow the user to create his own challenge. In the first scenario, server 310 can send to the user of client device 300 challenges from a challenge bank to allow the user to select challenges based on his preference. For example, the user interface can include an extra field that allows the user to browse and select challenges in the challenge bank. In addition to server 310 sending the challenges, in some embodiments, client device 300 can also download the entire challenge bank. For example, client device 300 can download from server 310 the challenge bank when the user chooses the manual mode. Alternatively, the challenge bank can also be stored locally on client device 300. For example, the challenge bank can be installed locally when the user installs or updates the service-enablement application on client device 300.

In some embodiments, the challenge bank can include challenges of different categories. Server 310 can send a list of categories to client device 300 to allow the user of client device 300 to choose a particular category. Server 310 can then select challenges from that particular category.

If the system allows the user to create his own challenge, a challenge-creation interface can be displayed to the user to allow the user to either enter text for his own challenge or edit a system-generated challenge. In the example shown in FIG. 4B, the user has selected the manual mode, and challenge-creation interface 416 is provided to allow the user to enter a challenge (e.g., an open-ended question) and a matching response (e.g., an answer to the question).

Subsequent to assembling the red envelopes and generating challenges, server 310 can send the red-envelope notice and challenges to one or more recipients, including the user of client device 320 (operation 308). If the destination of the red envelope is a user group, the red-envelope notice can be displayed on the group chat interface. If the destination is an individual, the red-envelope notice can be displayed on the individual chat interface.

Figure 4D:
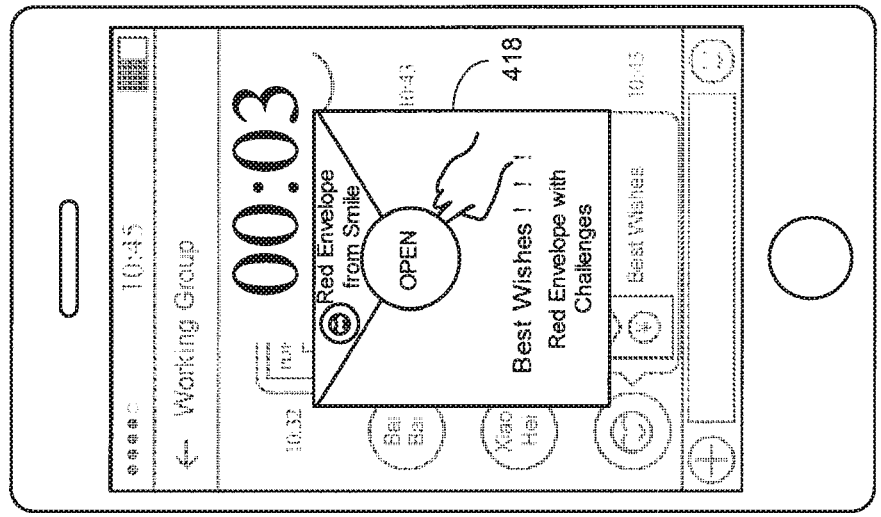
Figure 4C:
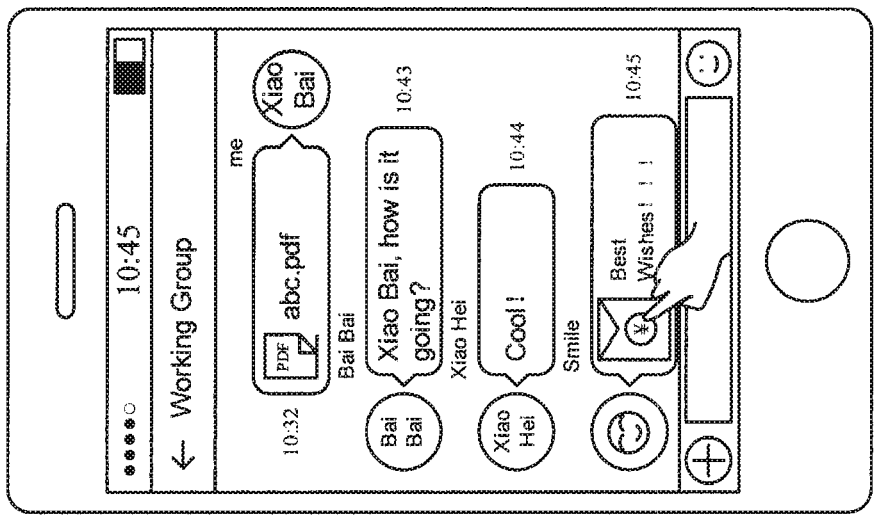

The user of client device 320 can activate the red envelope (operation 312). In some embodiments, the user of client device 320 can activate the red envelope by clicking or tapping on the red-envelope icon (as shown in FIG. 4C). In certain scenarios, to prevent the red-envelope notice from being drown out by other messages, the system can display a special red-envelope-receiving page which shows a relatively large red-envelope icon 418 "floating" above other chat content, as shown in FIG. 4D. The user can tap on icon 418 to activate the red envelope. To prevent prolonged disturbance to normal communications, a timer can also be displayed, indicating the remaining display time of this special red-envelope-receiving page. After the time is up, icon 418 disappears and the normal chat interface (e.g., the one shown in FIG. 4C) will be displayed.

Client device 320 can then notify server 310 that the user has activated the red envelope by sending the activation notice to server 310 (operation 314). In response to receiving the activation notice, server 310 can send an initial red envelope and a challenge to client device 320. The initial red envelope can contain a portion of the content included in the original red envelope initiated by the user of client device 300. For example, if the original red envelope contains a cash amount of $10, the initial red envelope can contain a portion (e.g., 20%) of the $10. More specifically, sending the initial red envelope means depositing a portion of the money amount to the account of the user of client device 320. By rewarding the recipient for activating the red envelope, the system can actively engage the recipient in taking further actions. Alternatively, server 310 may only send the challenges to client device 320.

In some embodiments, after sending the initial red envelope, server 310 can also send a notice to client device 300, notifying the sender of the red envelope (operation 318).

Figure 4F:
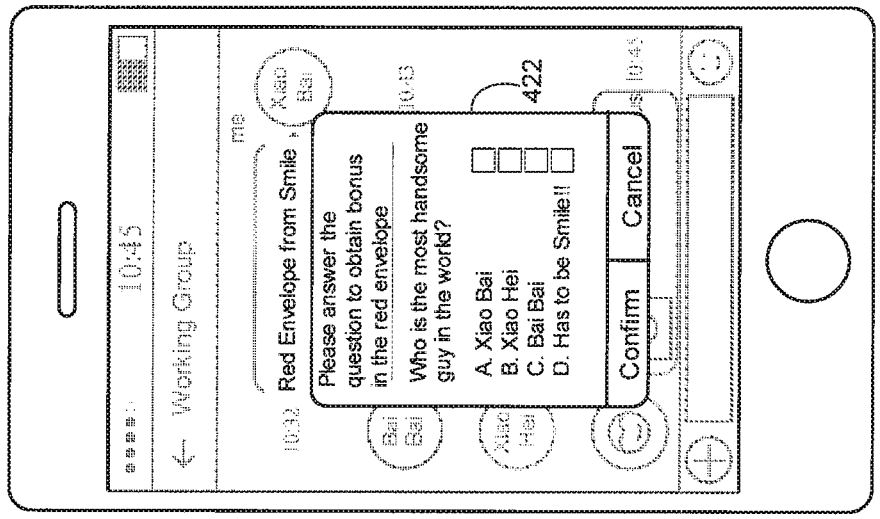
Figure 4E:
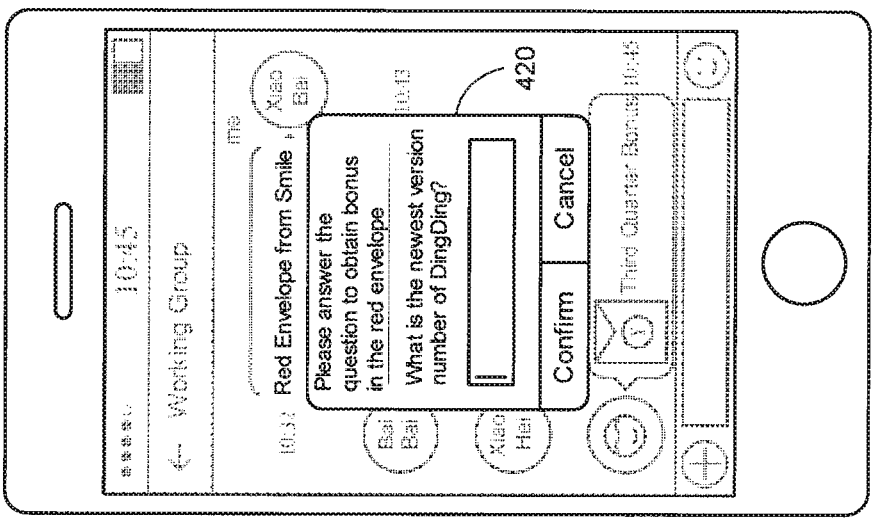

Subsequent to receiving the challenge and possibly the initial red envelope, the user of client device 320 can input his response to the challenge (operation 322), and client device 320 can send the user response back to server 310 (operation 324). In some embodiments, after the user taps the red-envelope icon, a challenge page will be displayed, as shown in FIGS. 4E and 4F. In both examples, the challenge page displays a challenge input window (window 420 or 422) that displays the challenge and allows the user to enter a response to the challenge. In the example shown in FIG. 4E, the challenge is an open-ended question, and in the example shown in FIG. 4F, the challenge is a multiple-choice question. The user can input his response to the challenge using various technologies, including typing, voice input, etc.

After receiving the user response, server 310 verifies the user response (operation 326). If the challenge has been generated by the system, server 310 can look up the challenge bank to determine whether the user's response matches the correct response to a challenge stored in the challenge bank. On the other hand, if the challenge has been generated by the sender of the red envelope, server 310 can compare the answer provided by the sender with the answer provided by the recipient of the red envelope. For open-ended questions, the recipient's answer does not need to be an exact match of the sender's answer; a partial matching can also result in the response being a valid response. For instance, in the example shown in FIG. 4E, if the correct answer is 2.7.1, various responses from the recipient, including "2-7-1" and "271," can be considered correct. In some embodiments, server 310 can include a text-comparison module that can compare the difference between the predetermined response and the recipient's response. If the difference (e.g., a weighted edit distance) is smaller than a predetermined threshold, the system can determine that the received response is valid. For multiple-choice challenges (as the one shown in FIG. 4F), server 310 only needs to compare the recipient's choice to the predetermined choice.

If server 310 determines that the response received from client device 320 matches the predetermined correct response to the challenges, server 310 can then send a second red envelope (operation 328), which can include the remaining content of the original red envelope, to client device 320. In the aforementioned example, the initial red envelope includes 20% of the money amount included in the original red envelope. Consequently, the second red envelope can include the remaining 80% of the money amount included in the original red envelope.

In some embodiments, to encourage user participation, the system can be configured in such a way that, even if the response sent by the user of client device 320 does not match the predetermined correct response, server 310 can still send a second red envelope, as long as the response meet certain criteria. For example, in the event of answering an open-ended question (as in the example shown in FIG. 4E), as long as the string length (e.g., the number of characters) of the answer input by the recipient exceeds a predetermined threshold, server 310 can send a second red envelope to the recipient. This second red envelope can include part or all of the remaining content of the original red envelope. Note that entering an answer having a minimum length demonstrates a certain level of user engagement, which is a desired user behavior and, hence, worth rewarding by marketers. The minimum length of the answer may vary based on the complexity of the questions.

Alternatively, the system may predetermine a number of keywords, and as long as the user's response includes one or more of the keywords, server 310 can send a second red envelope to the user, regardless of whether the user's response matches the predetermined correct response. For example, if the sender of the red envelope intends to promote a certain brand, the sender can define a number of keywords associated with the brand. As long as a user enters one or more of those keywords, the sender may reward the user with a second red envelope that can include part or all of the remaining content of the original red envelope.

In the event of answering multiple-choice questions, the system may list, in addition to the correct choice, other options that may be associated with the brand being promoted. In such a case, even if the user fails to select the correct answer, as long as the user selects a displayed option that is associated with the brand, server 310 can still send a second red envelope to the user, because the marketer considers that the user has been exposed to the brand and is, therefore, worth rewarding.

Although not shown in FIGS. 4E-4F, these additional criteria for receiving the second red envelope can also be displayed in the challenge page, notifying the recipients of possible ways to obtain the second red envelope.

In scenarios where the red-envelope function is used by marketers for promotional activities, the marketers can also use the responses from the users to gather statistics. For example, the challenges can be the survey questions, either as open-ended questions shown in FIG. 4E, or as multiple-choice questions shown in FIG. 4F. Recipients of the red envelopes can be rewarded with cash or virtual merchandise by sending their responses. In some embodiments, a communication mobile app (such as DingTalk) can include a survey module, which can be configured to automatically generate red envelopes for survey purposes. For example, the survey module can provide a survey interface to allow a user to plan a survey by creating questions and selecting survey targets. According to the user's survey plan, the system can create red envelopes and challenges (survey questions) associated with the red envelopes, and can send the red envelopes and survey questions to the appropriate recipients. The system can further reward recipients for responding to the survey and collect statistics based on received user responses.

Figure 4G:
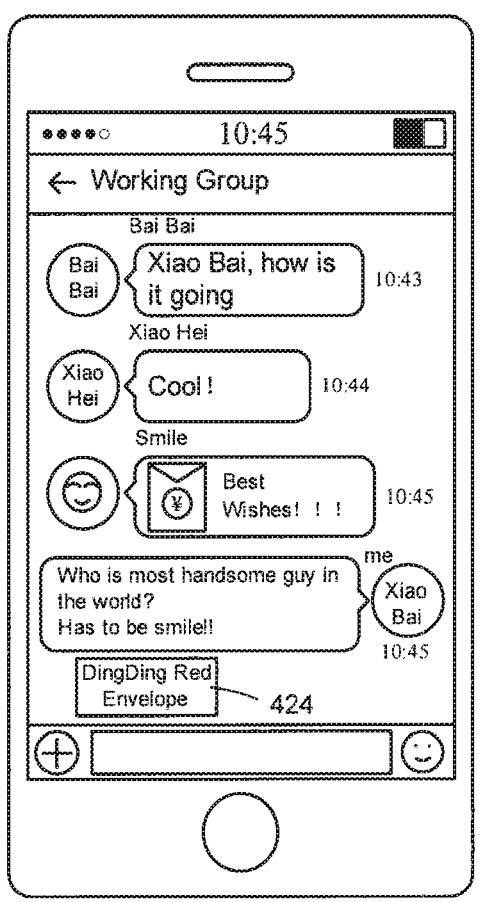

Subsequent to sending the second red envelope, server 310 can notify the sender of the red envelope by sending a notice to client device 300 (operation 330). After sending the second red envelope, server 310 can also broadcast the status of the red envelope (operation 332), as shown in FIG. 4G. In the example shown in FIG. 4G, the broadcast message also includes the challenge and the user's response to the challenge. If the challenge itself is used to promote a brand, broadcasting the challenge and response can further promote that brand. In the example shown in FIGS. 4F and 4G, a recipient (i.e., user Xiao Bai) chose the correct answer of the question. Server 310 can broadcast his answer to the chat group. In FIG. 4G, the broadcast message is displayed in a way as if the message is sent out by the recipient (i.e., Xiao Bai). A special red-envelope icon 424 can be used to indicate that the message is indeed generated and sent by the system to distinguish such messages from the real messages sent by user Xiao Bai. The broadcasted message can also have other formats. In some embodiments, the system may broadcast the challenge and response each time it receives a response, regardless of whether the response matches the predetermined correct answer.

In the examples shown in FIG. 3 and FIGS. 4A-4G, the red envelope is delivered to the user of client device 320 using a two-stage process. In the first stage, no challenge is presented to the user, and the user can receive an initial red envelope simply by activating the red envelope. In the second stage, also known as the bonus stage, the user is presented with a challenge and is required to input a response to the challenge. In practice, the first stage of the operation can be optional. In other words, the system will not send an initial red envelope, and the recipient can only obtain the red envelope by responding to the challenges. In an alternative embodiment, sever 310 may send the red-envelope notice along with challenge to client device 320, and client device 320 needs not to send a separate activation notice back to server 310. Instead, client device 320 can send the response to the challenge to server 310, which can then send an initial red envelope before verifying the response.

After the user's response being verified, server 310 can then send a second red envelope to client device 320.

In the examples shown in FIG. 3 and FIGS. 4A-4G, only one red envelope is delivered and only one challenge is associated with the red envelope. Consequently, the recipient only needs to input one response, which may or may not match the predetermined response, in order to claim the red envelope. In alternative embodiments, a red-envelope sender may associates multiple challenges (e.g., questions) with a red envelope. A recipient's response can be considered to match the predetermined response only if he can correctly answer all questions. Otherwise, the response can be considered a mismatch or a partial match (e.g., if he answered some questions correctly).

In some embodiments, a sender-initiated red envelope can also be considered a collection of smaller red envelopes, with each smaller red envelope associated with a challenge. A recipient can then claim a particular smaller red envelope if he correctly responds to its associated challenge. He may not claim another smaller red envelope if he fails the challenge associated with that smaller red envelope, unless the system uses additional criteria (e.g., the length of the answer or keyword-matching) to distribute red envelopes. In some embodiments, the smaller red envelopes may have different weight factors (i.e., containing different portions of the larger red envelope), and the difficulty level of the challenges assigned to them can correspond to their weight factors. A smaller red envelope having a larger weight factor is typically associated with a more difficult challenge.

Figure 5B:
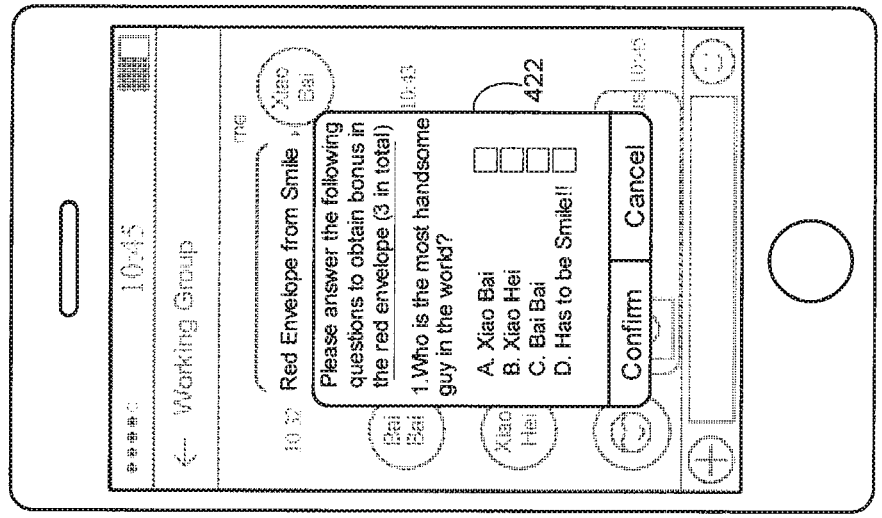
FIGS. 5A-5C illustrate the screenshots of the user interface in the scenario of multiple challenges being associated with a red envelope, in accordance with an embodiment of the present invention.
Figure 5A:
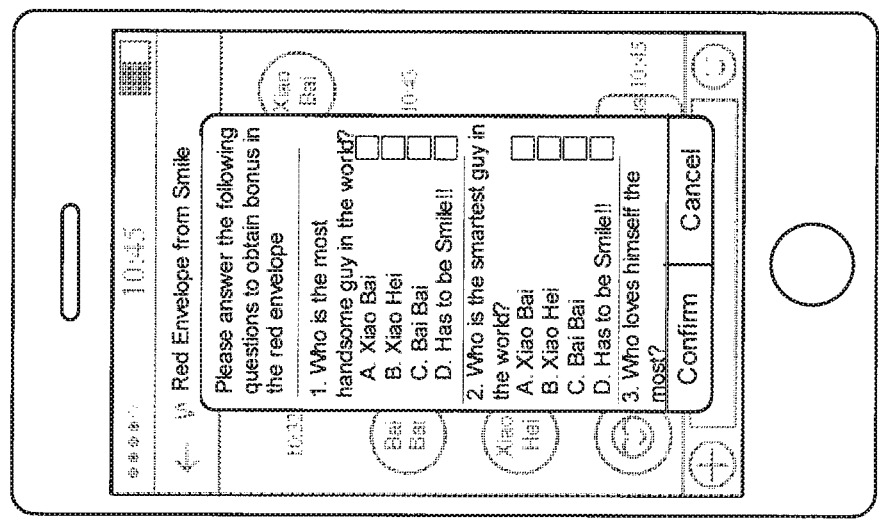
Figure 5D:
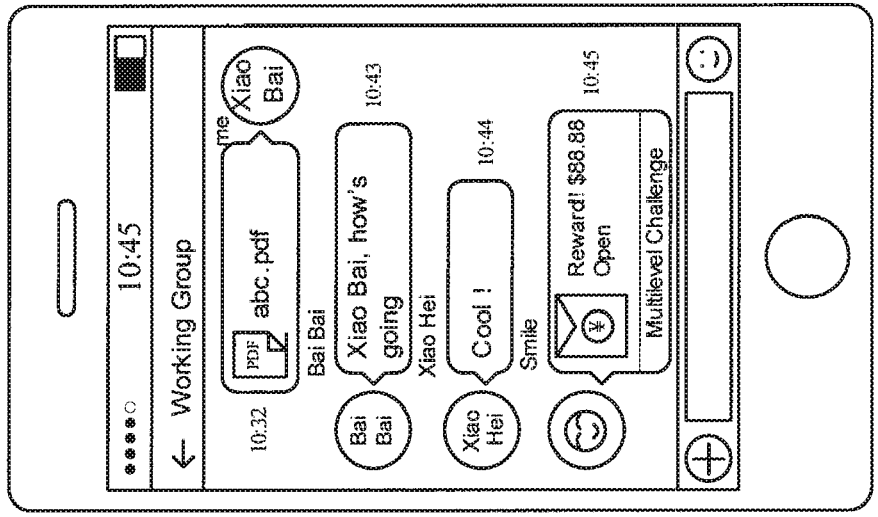
FIGS. 5D-5I illustrate the screenshots of the user interface associated with the distribution of a multilevel red envelope, in accordance with an embodiment of the present invention.
Figure 5C:
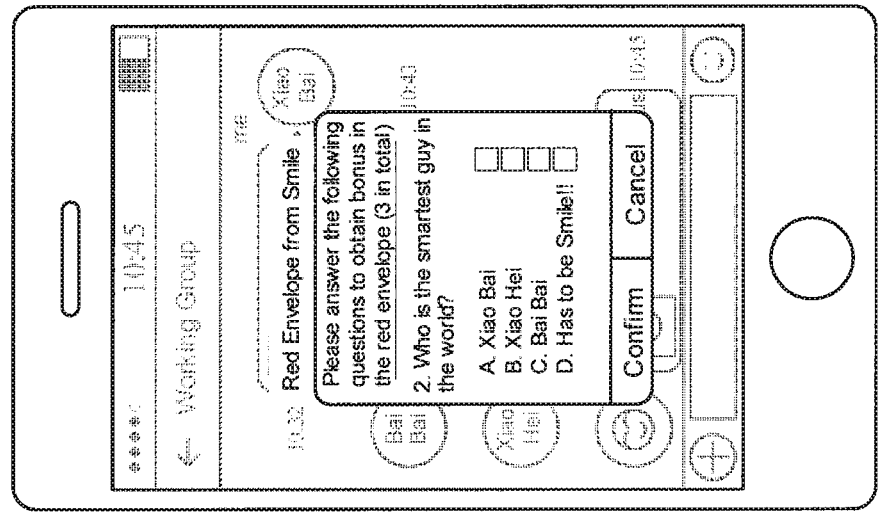

FIGS. 5A-5C illustrate the screenshots of the user interface in the scenario of multiple challenges being associated with a red envelope, in accordance with an embodiment of the present invention.

In FIG. 5A, after the recipient activates the red envelope, the server can send and display all challenges (three in total) to the recipient(s). A recipient can then respond to all these challenges within the same interface and send the responses back to the server by simply clicking on the "confirm" button. Because only one round-trip communication between the server and the client device is needed for sending the challenges and receiving responses, this approach can reduce the bandwidth usage. Alternatively, the server can send and display the challenges over multiple rounds. For example, the server can send and display one challenge at a time, or the server can send and display one or more challenges each time, until all challenges have been sent and displayed.

In the example shown in FIGS. 5B and 5C, the server sends and displays one challenge at a time on the client device of the recipient. In some embodiments, the server can be configured to withhold a subsequent challenge until the server receives a response for the previous challenge. In further embodiments, the server can be configured to withhold the subsequent challenge until the server determines that the received response to the previous challenge matches the predetermined response. For example, in FIG. 5B, a first challenge is displayed. The user can input a response to the challenge by selecting an answer and can send the response to the server by clicking the "confirm" button. Upon receiving the user's response, the server can determine whether the user's response matched the predetermined correct answer; if so, the server can send the second challenge to be displayed on the client device, as shown in FIG. 5C. This process repeats itself until all challenges have been sent and displayed. This approach can effectively attract the user's attention, because the user cannot see the additional challenges unless he correctly answers the current challenge.

Moreover, this dynamic interaction between the user and the server can also increase the user's engagement with the task of obtaining the red envelope. The user experience of successfully responding to a series of challenges before obtaining the red envelope can be similar to that of playing a multilevel game, which typically can be very successful in engaging a player. Such special red envelopes can also be referred to as the "multilevel" red envelopes.

In some embodiments, if a red envelope is sent as a multilevel red envelope, the system can display a special red-envelope icon to draw the attention of the recipients. More specifically, the special icon can indicate the content of the red envelope and that the red envelope is a multilevel red envelope. FIGS. 5D-5I illustrate the screenshots of the user interface associated with the distribution of a multilevel red envelope, in accordance with an embodiment of the present invention.

In FIG. 5D, a user (user smile) is sending a multilevel red envelope over a group chat user interface. A multilevel red-envelope icon indicates the title of the red envelope and that the red envelope is a multilevel red envelope. In this example, the title "Reward!! $88.88" also indicates the total cash amount included in the red envelope. The red envelope title can be manually input by the sender in a way similar to the one shown in FIG. 4A. Alternatively, the red envelope title can be automatically generated by the system. For example, the system can generate a similar title based on the money amount of the multilevel red envelope.

Figure 5F:
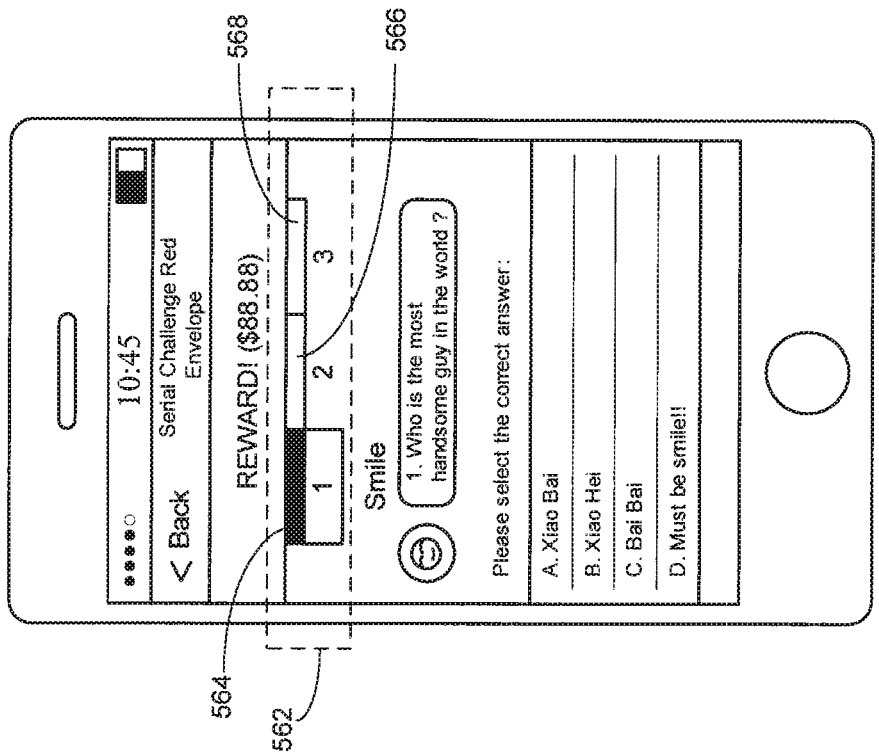
Figure 5E:
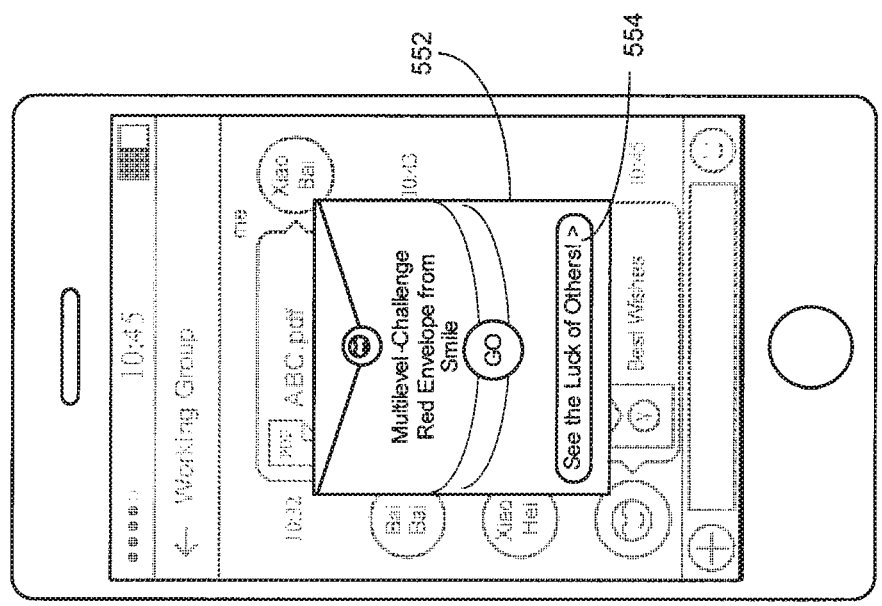

FIG. 5E shows the red-envelope page displayed on the client device of a targeted recipient. Similar to the example shown in FIG. 4D, an enlarged red-envelope icon 552 is displayed as floating above the group chat page. Icon 552 indicates the sender of the red envelope and that the red envelope is a multilevel red envelope. The recipient can trigger the red envelope by tapping the "go" button. In FIG. 5E, icon 552 can also include a button 554 that, once triggered, can display to the current user whether other users have claimed the red envelope.

Upon the recipient triggering the multilevel red envelope, the first challenge page can be displayed, as shown in FIG. 5F. In FIG. 5F, the user interface displays the first challenge for obtaining the multilevel red envelope and allows the recipient to enter his response. The user interface also includes a progress-indicating field 562, indicating the total number of challenges and the progress made by the user in responding to the challenges. In the example shown in FIG. 5F, progress-indicating field 562 shows a total of three challenges. The first challenge, as represented by Arabic numeral "1," is highlighted (shown as being surrounded by a rectangle), meaning that the first challenge is the currently displayed challenge, and the user can enter a response to the challenge in the current user interface. A shaded rectangle 564 positioned above the first challenge can also indicate that the user is allowed to view and respond to this challenge. Hollow rectangles 566 and 568 indicate that the user is prevented from viewing and responding to the second and third challenges.

Figure 5H:
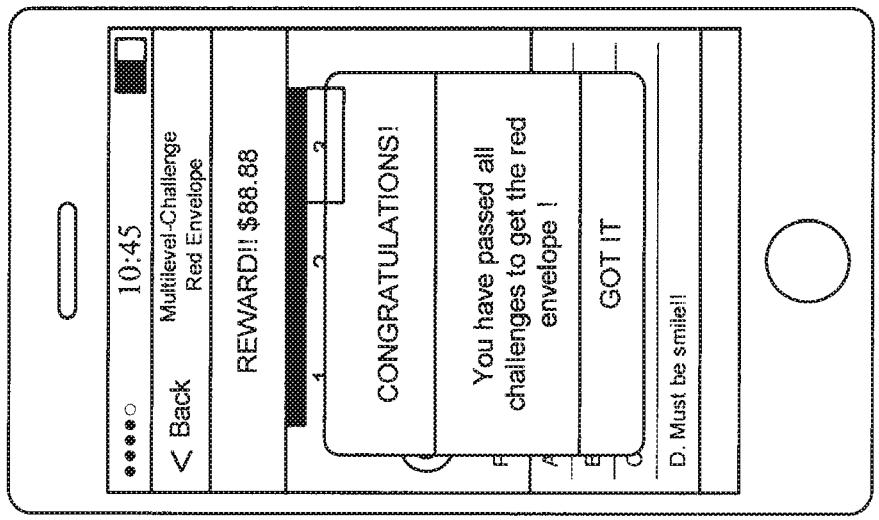
Figure 5G:
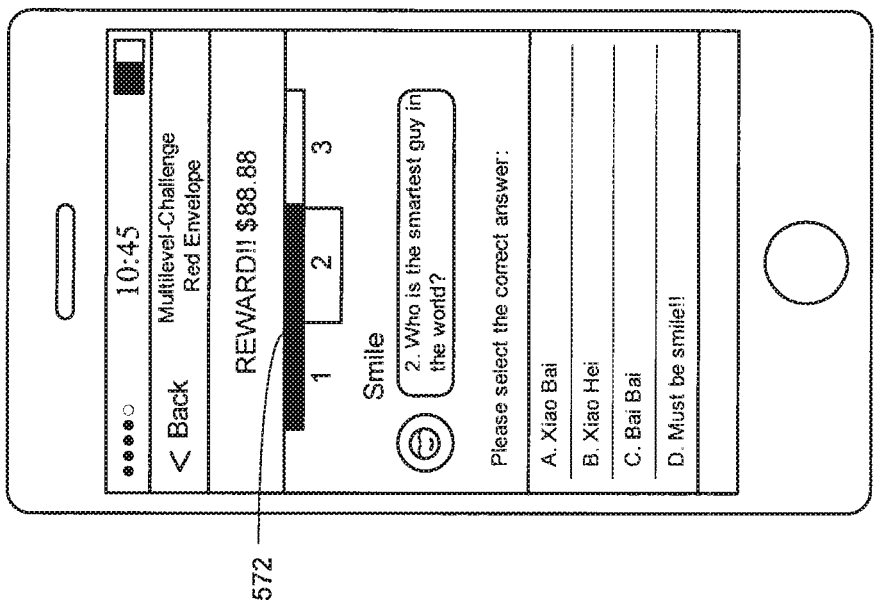

Once the user has responded to the first challenge, the user interface can be updated, as shown in FIG. 5G. In FIG. 5G, the second challenge, as represented by Arabic numeral "2," is highlighted, meaning that the second challenge is the currently displayed challenge, and user can enter a response to the challenge in the current user interface. Moreover, shaded rectangle 572 extends through the icons representing the first and second challenges, meaning that both the first and second challenges can be viewed. Shaded rectangle 572 can also be viewed as a progress bar, which indicates the user's progress in responding to challenges.

Figure 5I:
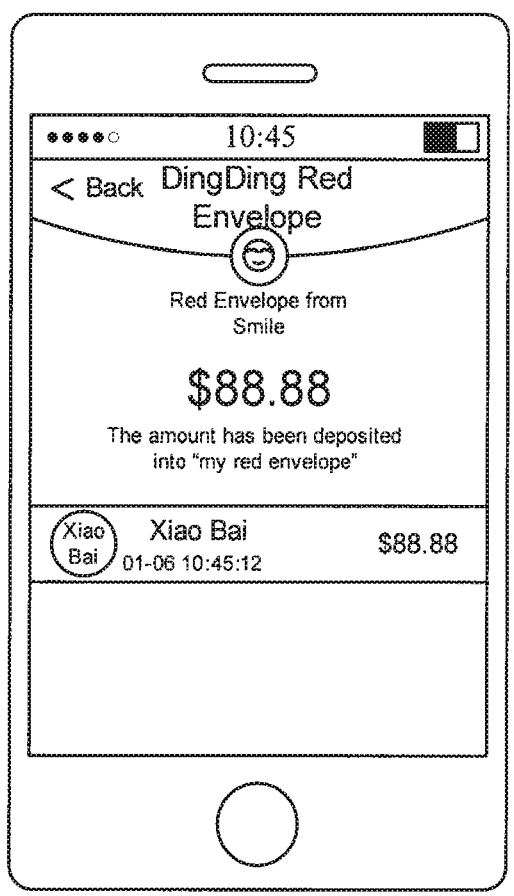

Upon the user sending all responses to the server, the server can determine if the user's responses match the correct responses stored in the system. If so, the server can send a notification to the user, as shown in FIG. 5H. If not, the server can also send a notification to let the user know. In some embodiments, the failure notification may also include the correct responses to the challenges. If a user taps button 554 shown in FIG. 5E, the system can display a list of users obtaining the red envelope, and optionally the cash amount they have obtained, as shown in FIG. 5I. In this example, only one red envelope is distributed, and the red-envelope-recipient list contains only one user.

In the examples shown in FIGS. 3, 4A-4G, and 5A-5I, only one red envelope is defined and sent, meaning that only one user among the targeted recipients can claim the red envelope. In practice, during initialization, a sender can define a plurality of red envelopes and send them to a group chat, and more than one participant of the group chat can claim a red envelope by responding correctly to challenges until all red envelopes have been claimed.

Figure 6:
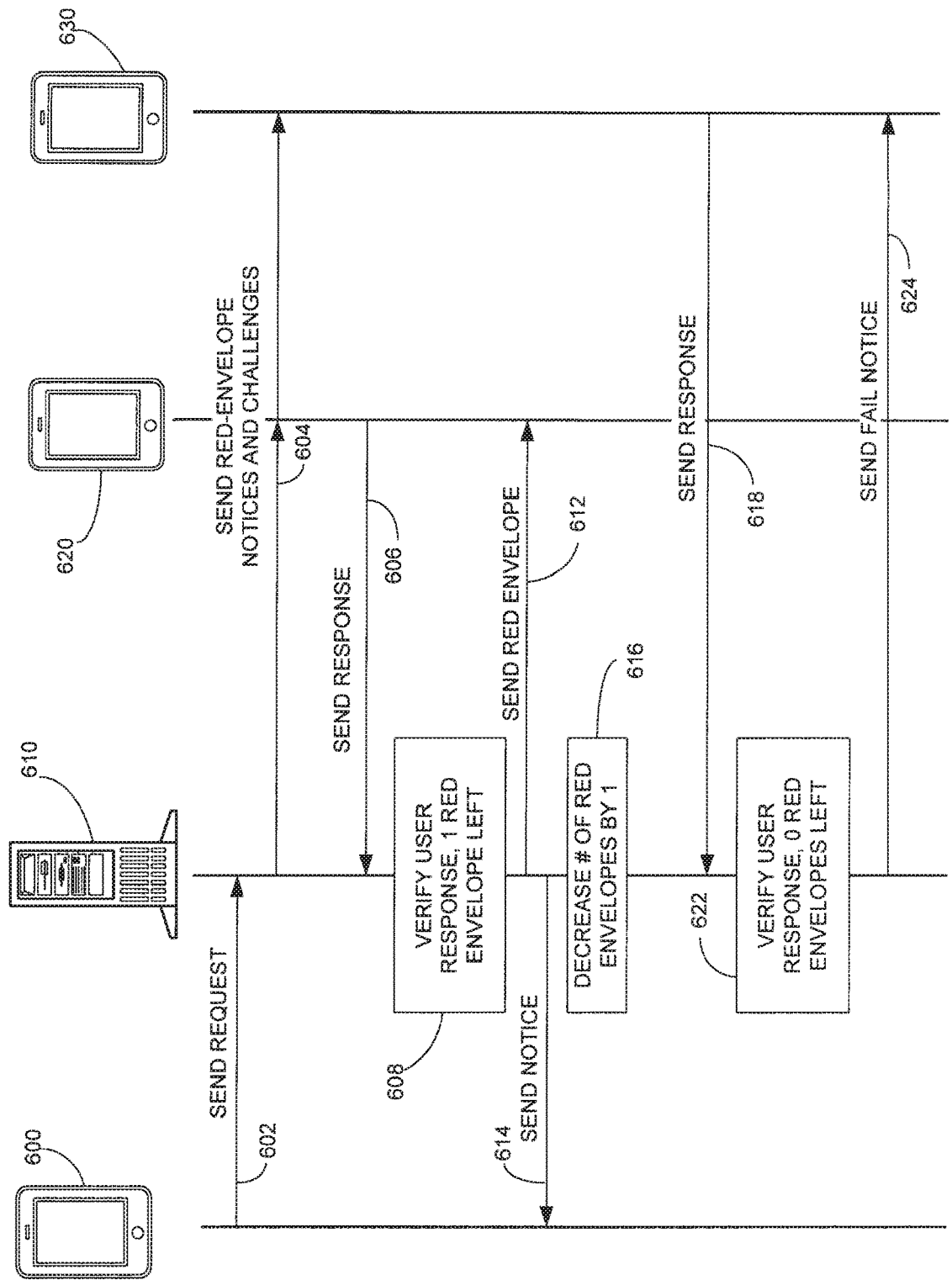
FIG. 6 presents a time-state diagram illustrating an exemplary process of distributing multiple red envelopes, in accordance with an embodiment of the present invention.

FIG. 6 presents a time-state diagram illustrating an exemplary process of distributing multiple red envelopes, in accordance with an embodiment of the present invention.

During operation, client device 600 can send a red envelope request to server 610 (operation 602). The process of initializing red envelopes and generating the red envelope request can be similar to operation 302 shown in FIG. 3, except that, during initialization, the user of client device 600 specifies, in addition to content, the number of red envelopes to be distributed. For example, if the red envelopes include cash rewards, within the request, the user of client device 600 can specify the total amount of cash to be included (e.g., $10 or $100) and the number of red envelopes to be distributed. The request can also specify the content of each red envelope or allow the system to randomly distribute the total amount among all red envelopes. For example, the user may intend to send a $10 reward to a group of targeted recipients using 10 red envelopes. The user can specify that each to-be-distributed red envelope include $1, or the user can ask the system to randomly distribute the $10 among the 10 red envelopes.

Server 610 can then send a red-envelope notice along with one or more challenges to client devices 620 and 630 (operation 604). Users of client devices 620 and 630 may participate in the same group chat session. In some embodiments, all of the red envelopes associated with the single request can be associated with the same challenge. Server 610 only needs to send that challenge to client devices 620 and 630. In alternative embodiments, different red envelopes can be associated with different challenges, and server 610 needs to send multiple challenges to client devices 620 and 630.

The user of client device 620 may input a response to the challenge, and client device 620 can send the user's response to server 610 (operation 606). Upon receiving the user's response, server 610 verifies the user's response and determines whether there are still not-yet-distributed red envelopes (operation 608). In the example shown in FIG. 6, there is still one red envelope left. If the user's response meets one or more of the predetermined criteria (including matching a predetermined correct answer, being longer than a predetermined length, having one or more keywords, etc.), server 610 can provision a red envelope (e.g., by obtain the corresponding fund from the user's financial account) and send the provisioned red envelope to client device 620

(operation 612). Subsequent to sending the red envelope, server 610 can send a notice to client device 600, notifying the sender that a user has successfully claimed a red envelope (operation 614), and decrease the number of red envelopes by 1 (operation 616). In this example, there was only one red envelope before operation 612, and the number of red envelopes decreases to 0 afterwards.

Subsequently, the user of client device 630 can also send a response to the challenge to server 610 (operation 618). Server 610 can verify the user's response (operation 622) and determine the number of available red envelopes. In this scenario, there are no more red envelopes. Hence, even if the received response meets one of the predetermined criteria, there are no more red envelopes to distribute, and server 610 has to send a failure notice to client device 630 (operation 624).

When one or more red envelopes are destined to a user group (e.g., a chat group), any member can claim a red envelope. The number of red envelopes typically is less than the number of users. In some embodiments, the red envelopes can be distributed in a "first come, first served" manner. In other words, the system can distribute the red envelopes based on the timing of the users responding to the challenge or challenges. Whoever responds to the challenge first will get the first red envelope. The next red envelope will be delivered to the second responder, and so on. To obtain a red envelope, users in the user group need to respond to the challenges quickly. This can sometimes be referred to as the "snatching the red envelopes." Because the users are competing against their peers in responding to challenges, they can often be more engaged.

Some of the challenges accompanying the red envelopes can be quite difficult. To further enhance the level of interactions between the recipient of the red envelope and the server distributing the red envelope, in some embodiments, the system can allow a targeted recipient to enlist help from other users in order to correctly respond to the challenge. For example, if a targeted recipient determines that he may not be able to provide the appropriate response to a challenge (e.g., a question or a puzzle), he can send a collaboration request to the server. The server can then forward the red envelope along with the challenge to a second user based on the collaboration request. If the second user is able to correctly respond to the challenge, the server may send the red envelope or portions of it to both the original target recipient and the second user.

Figure 7:
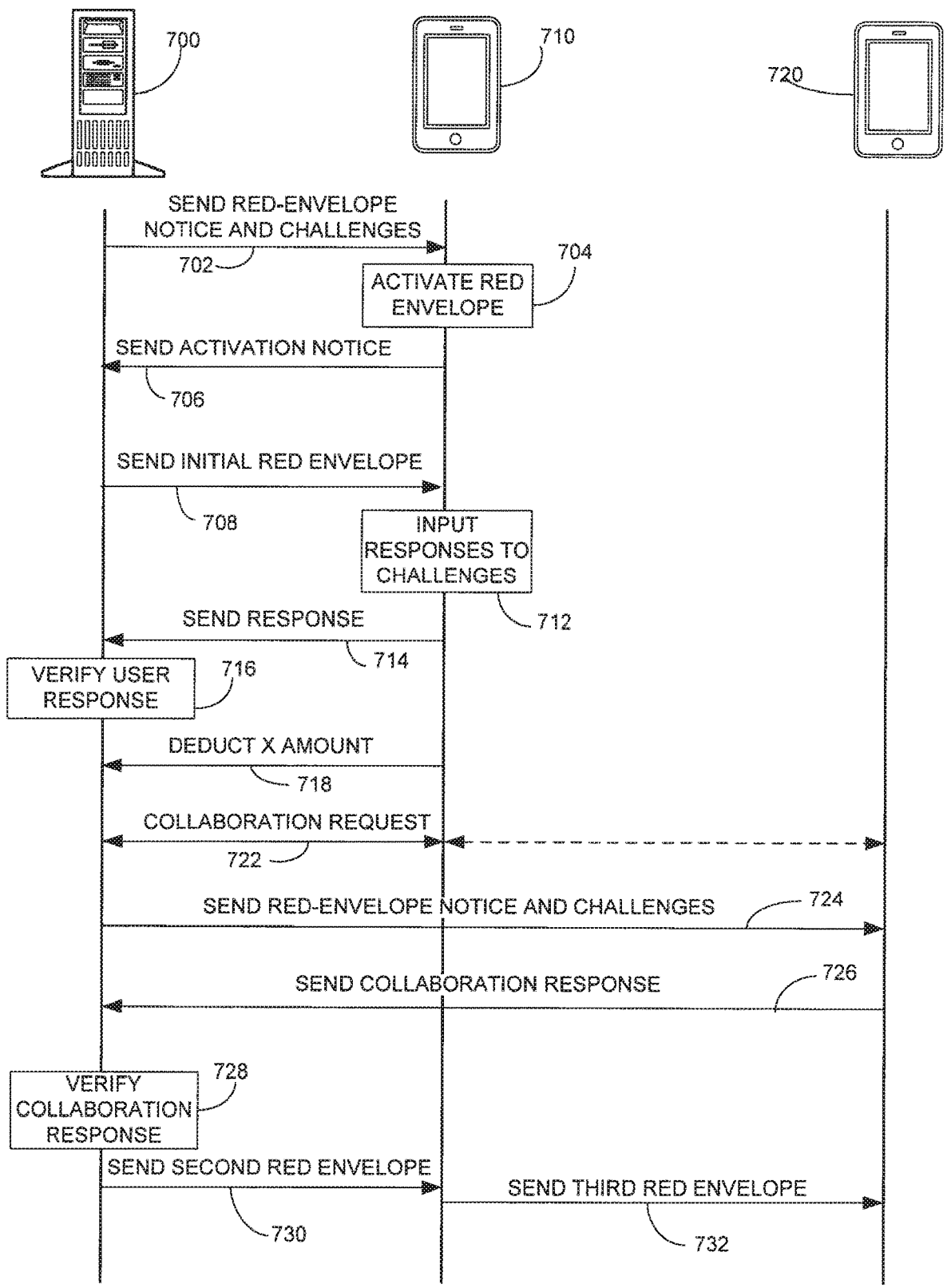
FIG. 7 provides a time-state diagram illustrating an exemplary red-envelope distribution process involving user collaborations, in accordance with an embodiment of the present invention.

FIG. 7 provides a time-state diagram illustrating an exemplary red-envelope distribution process involving user collaborations, in accordance with an embodiment of the present invention. During operation, a server 700 may send a red-envelope notice along with one or more challenges to client device 710 of a targeted recipient (operation 702). Note that in FIG. 7, the client device that sends the red envelope is not shown, because its operation is similar to the operations of client device 300 shown in FIG. 3.

In response to the red-envelope notice, the targeted recipient can activate the red envelope (e.g., by tapping the red-envelope icon displayed on the touchscreen display) (operation 704). Client device 710 then sends the activation notice to server 700 (operation 706).

In some embodiments, server 700 can send an initial red envelope to client device 710 to reward the targeted recipient for participation (operation 708). Operations 704-708 can be similar to operations 312-316 shown in FIG. 3. In some embodiments, instead of accompanying the red envelope notice, the challenges can be sent from server 700 to client device 710 along with the initial red envelope.

Subsequently, the targeted recipient of client device 710 can input responses to the one or more challenges (operation 712), and client device 710 can send the response to server 700 (operation 714). Server 700 verifies the user response (operation 716). In the example shown in FIG. 7, because server 700 can determine that the received user response is a mismatch to the predetermined correct response, server 700 can deduct at least a portion of the content of the initial red envelope from the account of the targeted recipient (operation 718). In other words, server 700 is taking back at least a portion of the red envelope that has been previously rewarded to client device 710. In some embodiments, sending the initial red envelope can involve depositing funds into the account of the targeted recipient. As a result, in order to perform operation 718, server 700 may need to access that account to deduct the desired amount of funds. In alternative embodiments, sending the initial red envelope merely means reserving or provisioning funds to the targeted recipient, without actually distributing the funds. Consequently, operation 718 can involve modifying the amount of funds reserved or provisioned to the targeted recipient. The actual deposition of funds to the account of the targeted recipient can occur after the completion of the entire red-envelope distribution process. In some embodiments, server 700 cannot deduct more than what is included in the initial red envelope. This can prevent the sender from taking advantage of the targeted recipient by setting up difficult or impossible challenges. In alternative embodiments, server 700 may deduct from the account of the targeted recipient more than what is included in the initial red envelope. This is similar to establishing a game of challenge-and-response between the sender and the targeted recipient. The send challenges the recipient, who can choose to respond. A correct response can be rewarded with the red envelope, and an incorrect response can result in a loss. The loss amount can be unrelated to the amount included in the red envelope.

Because the desired recipient fails to provide a correct response, client device 710 can send a collaboration request to server 700 (operation 722). The collaboration request can specify a collaboration target, which can be a friend of the original desired recipient. Optionally, client device 710 can also send the collaboration request to client device 720 of the collaboration target. Alternatively, the collaboration request may not specify a target, and server 700 can select a collaboration target on behalf of the original recipient and send a collaboration notice to the collaboration target.

In response to receiving the collaboration request, server 700 can send the red-envelope notice and the challenges to client device 720 (operation 724). Upon receiving the red-envelope notice and challenges, client device 720 can send the collaboration response to server 700 (operation 726). Server 700 verifies the collaboration response (operation 728). If the collaboration response matches the predetermined correct response, server 700 can send a second red envelope to client device 710 (operation 730) and send a third red envelope to client device 720 (operation 732). Alternatively, server 700 may send only one red envelope either to client device 710 or to client device 720.

Figure 8:
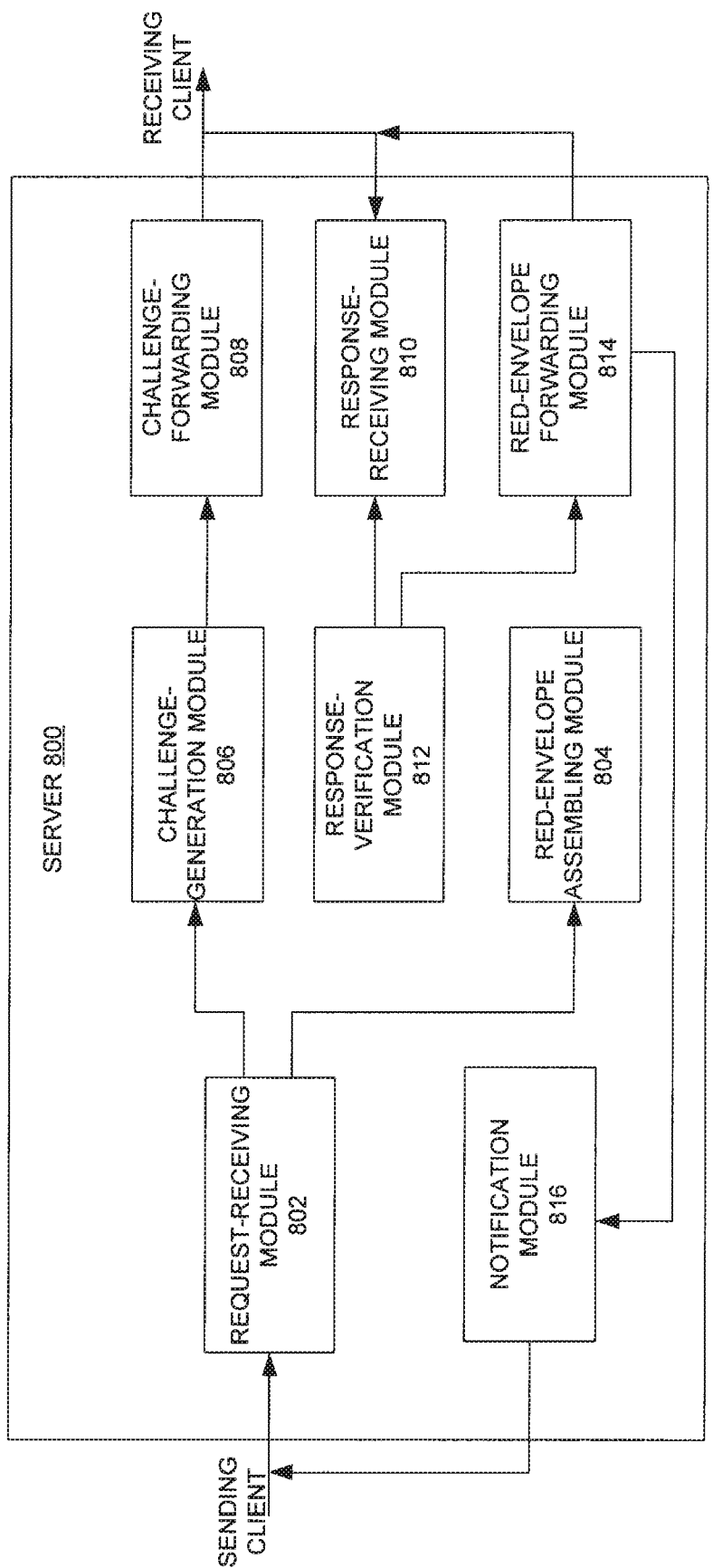
FIG. 8 presents a block diagram illustrating the architecture of a server for enabling the red-envelope distribution service, in accordance with an embodiment of the present invention.

FIG. 8 presents a block diagram illustrating the architecture of a server for enabling the red-envelope distribution service, in accordance with an embodiment of the present invention. Server 800 can include a request-receiving module 802 for receiving requests from client devices, a red-envelope assembling module 804 for assembling red envelopes, a challenge-generation module 806 for generating challenges, a challenge-forwarding module 808 for forwarding the challenges to client devices, a response-receiving module 810 for receiving responses to the challenges, a response-verification module 812 for verifying the received responses, a red-envelope forwarding module 814 for forwarding the red envelopes, and a notification module 816 for sending notifications to client devices.

During operation, request-receiving module 802 receives from a client device a request to distribute one or more red envelopes. In response to the request, red-envelope assembling module 804 can assemble the red envelopes based on the request, and challenge generation module 806 generates one or more challenges based on the request. Challenge forwarding module 808 forwards the generated requests to one or more targeted receiving client devices, and response-receiving module receives from the client devices responses to the challenges. Response verification module 812 verifies the responses to the challenges. If the responses match predetermined correct responses, red-envelop forwarding module 814 can forward the red envelope to the client device sending the correct response. Notification module can then notify the sending device that the red envelope has been distributed.

In the aforementioned examples, the enabled service is a red-envelope distribution service, and content of the red envelopes can include cash rewards. In practice, the similar service can also be used to distribute other types of real or virtual objects over the internet, such as coupons, certificates (that can be used to exchange for cash or other merchandise), points or badges used in online games, virtual currencies, etc. For example, instead of receiving a request for distributing red envelopes, the server may receive a request for distributing certain type of objects (e.g., coupons) and can then assemble an object package for distribution accordingly (e.g., generating particular types of coupons). Similar to a red envelope containing the user-specified funds, the object packet can include a number of objects, with the number matching that defined in the request. If an object can be assigned a value, the value can match that defined in the request. For example, a request may specify a 20%- or 30%-off coupon, or 10 badges. To receive the package, a targeted recipient need to respond to challenges presented to them. If the recipient has correctly responded to the challenges, the server can then deliver the package to the recipient.

Figure 9:
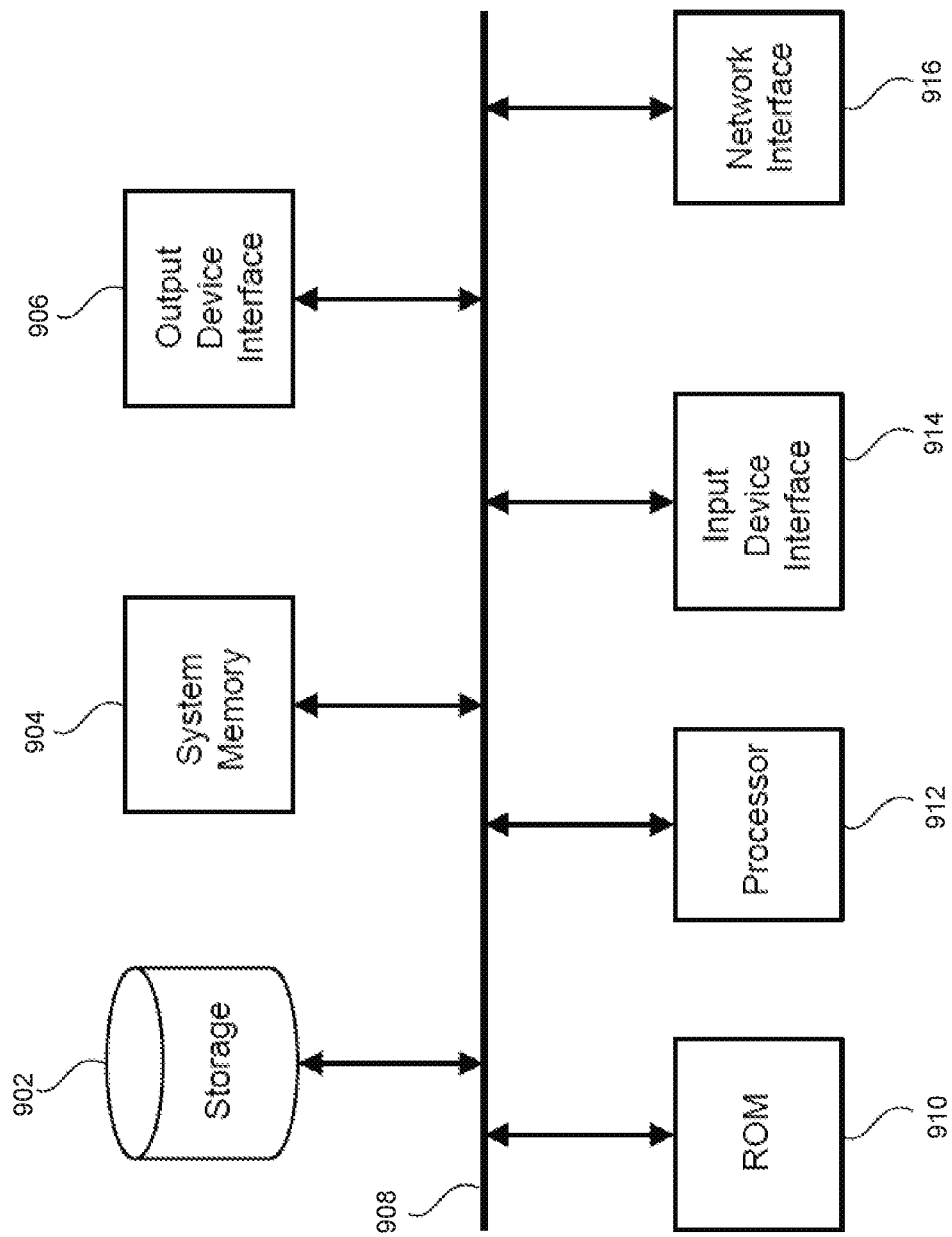
FIG. 9 conceptually illustrates an electronic system with which some implementations of the subject technology are implemented.

FIG. 9 conceptually illustrates an electronic system with which some implementations of the subject technology are implemented. Electronic system 900 can be a client, a server, a computer, a smartphone, a PDA, a laptop, or a tablet computer with one or more processors embedded therein or coupled thereto, or any other sort of electronic device. Such an electronic system includes various types of computer readable media and interfaces for various other types of computer readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that functions as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), or an Intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for distributing funds over a computer network using an instant messaging application, the method comprising:

receiving, by a server from a user of a first client device, a request to distribute a fund among a predetermined set of users;

generating, by the server, a set of virtual envelopes to be distributed among the predetermined set of users based on the received request, wherein a respective virtual envelope among the generated set of virtual envelopes corresponds to a portion of the to-be-distributed fund;

obtaining at least one challenge associated with the generated set of virtual envelopes and a predetermined response corresponding to the challenge;

presenting the challenge on a user interface of the instant messaging application associated with a set of client devices corresponding to the predetermined set of users;

receiving, by the server via the user interface of the instant messaging application, responses to the challenge from multiple client devices of the set of client devices;

based on a time sequence of the received responses, consecutively determining, by the server, whether the received responses meet at least one or more of predetermined criteria, wherein the predetermined criteria include a string length of the received response exceeding a predetermined value;

in response to a response to the challenge received from a second client device meeting at least one of the predetermined criteria and a count of remaining virtual envelopes of the generated set of virtual envelopes being greater than zero, distributing, by the server, a virtual envelope from the generated set of virtual envelopes to a user of the second client device over the computer network; and decreasing the count of the remaining virtual envelopes by one;

wherein the challenge comprises multiple stages, and wherein the method further comprises:
    in response to receiving, from the user of the second client device, a response to a first stage of the challenge, determining whether the response to the first stage of the challenge meets at least one of the predetermined criteria;
    in response to determining that the response to the first stage of challenge meets at least one of the predetermined criteria, presenting to the user of the second client device a second stage of the challenge; and
    in response to determining that a response received from the user of the second client device to the second stage of the challenge meets at least one of the predetermined criteria, distributing the virtual envelope from the generated set of virtual envelopes to the user of the second client device.

2. The computer-implemented method of claim 1, wherein obtaining the challenge and the predetermined response involves one of:
    extracting the challenge from a pre-installed challenge bank comprising a plurality of challenges;
    receiving an input from a user of the first client device to select the challenge and the predetermined response from the pre-installed challenge bank; and
    receiving an input that includes the challenge and the predetermined response from the user of the first client device.

3. The computer-implemented method of claim 1, wherein the challenge includes an open ended question or a multiple-choice question.

4. The computer-implemented method of claim 1, wherein the predetermined criteria further include one or more of:
    the received response at least partially matching the predetermined response corresponding to the challenge; and
    the received response includes one or more predetermined keywords.

5. The computer-implemented method of claim 1, further comprising:
    in response to receiving a collaboration request from the user of the second client device, forwarding the challenge to a user of a third client device;
    receiving a second response to the challenge from the third client device; and
    in response to the received second response to the challenge meeting at least one of the predetermined criteria, distributing the virtual envelope from the generated set of virtual envelopes to at least one of: the second client device and the third client device.

6. A non-transitory computer-readable storage medium storing instructions that when executed by a computer cause the computer to perform a method for distributing funds over a computer network using an instant messaging application, the method comprising:
    receiving, by a server from a user of a first client device, a request to distribute a fund among a predetermined set of users;
    generating, by the server, a set of virtual envelopes based on the received request, wherein a respective virtual envelope corresponds to a portion of the to-be-distributed fund;
    obtaining at least one challenge associated with the generated set of virtual envelopes and a predetermined response corresponding to the challenge;
    presenting the challenge on a user interface of the instant messaging application associated with a set of client devices corresponding to the predetermined set of users;
    receiving, by the server via the user interface of the instant messaging application, responses to the challenge from multiple client devices of the set of client devices;
    based on a time sequence of the received responses, consecutively determining, by the server, whether the received responses meet at least one or more of predetermined criteria, wherein the predetermined criteria include a string length of the received response exceeding a predetermined value;
    in response to a response to the challenge received from a second client device meeting at least one of the predetermined criteria and a count of remaining virtual envelopes of the generated set of virtual envelopes being greater than zero, distributing, by the server, a virtual envelope from the generated set of virtual envelopes to a user of the second client device over the computer network; and
    decreasing the count of the remaining virtual envelopes by one;
    wherein the challenge comprises multiple stages, and wherein the method further comprises:
        in response to receiving, from the user of the second client device, a response to a first stage of the challenge, determining whether the response to the first stage of the challenge meets at least one of the predetermined criteria;
        in response to determining that the response to the first stage of challenge meets at least one of the predetermined criteria, presenting to the user of the second client device a second stage of the challenge; and in response to determining that a response received from the user of the second client device to the second stage of the challenge meets at least one of the predetermined criteria, distributing the virtual envelope from the generated set of virtual envelopes to the user of the second client device.

7. The computer-readable storage medium of claim 6, wherein obtaining the challenge and the predetermined response involves one of:

extracting the challenge from a pre-installed challenge bank comprising a plurality of challenges;

receiving an input from a user of the first client device to select the challenge and the predetermined response from the pre-installed challenge bank; and receiving an input that includes the challenge and the predetermined response from the user of the first client device.

8. The computer-readable storage medium of claim 6, wherein the challenge includes an open ended question or a multiple-choice question.

9. The computer-readable storage medium of claim 6, wherein the predetermined criteria further include one or more of:

the received response at least partially matching the predetermined response corresponding to the challenge; and the received response includes one or more predetermined keywords.

10. The computer-readable storage medium of claim 6, wherein the method further comprises:

in response to receiving a collaboration request from the user of the second client device, forwarding the challenge to a user of a third client device;

receiving a second response to the challenge from the third client device; and in response to the received second response to the challenge meeting at least one of the predetermined criteria, distributing the virtual envelope from the generated set of virtual envelopes to at least one of: the second client device and the third client device.

11. A computer system for enabling a service over a computer network, the computer system comprising:

a processor; and a storage device coupled to the processor and storing instructions which when executed by the processor cause the processor to perform a method for distributing funds over a computer network using an instant messaging application, the method comprising:

receiving, by a server from a user of a first client device, a request to distribute a fund among a predetermined set of users;

generating, by the server, a set of virtual envelopes based on the received request, wherein a respective virtual envelope among the generated set of virtual envelopes comprises a portion of the to-be-distributed fund;

obtaining at least one challenge associated with the generated set of virtual envelopes and a predetermined response corresponding to the challenge;

presenting the challenge on a user interface of the instant messaging application associated with a set of client devices corresponding to the predetermined set of users;

receiving, by the server via the user interface of the instant messaging application, responses to the challenge from multiple client devices of the set of client devices;

based on a time sequence of the received responses, consecutively determining, by the server, whether the received responses meet at least one or more of predetermined criteria, wherein the predetermined criteria include a string length of the received response exceeding a predetermined value;

in response to a response to the challenge received from a second client device meeting at least one of the predetermined criteria and a count of remaining virtual envelopes of the generated set of virtual envelopes being greater than zero, distributing a virtual envelope from the generated set of virtual envelopes to a user of the second client device over the computer network; and decreasing the count of the remaining virtual envelopes by one;

wherein the challenge comprises multiple stages, and wherein the method further comprises:

in response to receiving, from the user of the second client device, a response to a first stage of the challenge, determining whether the response to the first stage of the challenge meets at least one of the predetermined criteria;

in response to determining that the response to the first stage of challenge meets at least one of the predetermined criteria, presenting to the user of the second client device a second stage of the challenge; and in response to determining that a response received from the user of the second client device to the second stage of the challenge meets at least one of the predetermined criteria, distributing the virtual envelope from the generated set of virtual envelopes to the user of the second client device.

12. The computer system of claim 11, wherein obtaining the challenge and the predetermined response involves one of:

extracting the challenge from a pre-installed challenge bank comprising a plurality of challenges;

receiving an input from a user of the first client device to select the challenge and the predetermined response from the pre-installed challenge bank; and receiving an input that includes the challenge and the predetermined response from the user of the first client device.

13. The computer system of claim 11, wherein the challenge includes an open ended question or a multiple-choice question.

14. The computer system of claim 11, wherein the predetermined criteria further include one or more of:

the received response at least partially matching the predetermined response corresponding to the challenge; and the received response includes one or more predetermined keywords.

15. The computer system of claim 11, wherein the method further comprises:

in response to receiving a collaboration request from the user of the second client device, forwarding the challenge to a user of a third client device;

receiving a second response to the challenge from the third client device; and in response to the received second response to the challenge meeting at least one of the predetermined criteria, distributing the virtual envelope from the generated set of virtual envelopes to at least one of: the second client device and the third client device.

\* \* \* \* \*